(12) United States Patent
Ball, Sr.

(10) Patent No.: US 12,730,890 B2
(45) Date of Patent: Sep. 8, 2026

(54) CYBERATTACK SIGNATURE GENERATION USING HOST LEVEL DATA ANALYTICS

(71) Applicant: Mandex, Inc., Fairfax, VA (US)

(72) Inventor: James Creig Ball, Sr., Johns Island, SC (US)

(73) Assignee: Mandex, Inc., Fairfax, VA (US)

( * ) Notice: Subject to any disclaimer, the term of this patent is extended or adjusted under 35 U.S.C. 154(b) by 83 days.

(21) Appl. No.: 18/512,685

(22) Filed: Nov. 17, 2023

(65) Prior Publication Data

US 2024/0086533 A1 Mar. 14, 2024

Related U.S. Application Data

(63) Continuation of application No. PCT/US2022/030402, filed on May 20, 2022.
(Continued)

(51) Int. Cl.
*G06F 21/55* (2013.01)
*G06F 21/56* (2013.01)
*H04L 9/40* (2022.01)

(52) U.S. Cl.
CPC .......... *G06F 21/564* (2013.01); *G06F 21/566* (2013.01)

(58) Field of Classification Search
CPC ...... G06F 21/564; G06F 21/566; G06F 21/56; G06F 21/55; H04L 9/40
See application file for complete search history.

(56) References Cited

U.S. PATENT DOCUMENTS 6,789,202 B1 * 9/2004 Ko ........................ G06F 21/552 726/1
8,925,090 B2 12/2014 Kc et al.
(Continued)

FOREIGN PATENT DOCUMENTS

CN 109753800 A 5/2019
EP 1812852 B1 5/2016
(Continued)

OTHER PUBLICATIONS

Moustafa et al.; "Data Analytics-enabled Intrusion Detection: Evaluations of ToN_ IoT Linux Datasets", 2020 IEEE 19th International Conference on Trust, Security and Privacy in Computing and Communications (Trustcom), IEEE, Dec. 29, 2020, pp. 727-735.
(Continued)

*Primary Examiner* — Jayesh M Jhaveri
(74) *Attorney, Agent, or Firm* — Thompson Coburn LLP

(57) ABSTRACT

A host computer system can be monitored to track its system performance data with respect to internal system parameters, and this monitoring can be performed when the host computer system is known to be under a cyberattack and when it is known to not be under the cyberattack. The system performance data for the host in these conditions can be comparatively analyzed by host level data analytics to find a subset of the internal system parameters and their corresponding data values that discriminatively correlate to the cyberattack. From this information, a cyberattack signature can be generated. The host system can thereafter be monitored based on its system performance data to determine whether this system performance data matches the cyberattack signature to support determinations as to whether the host is under cyberattack.

26 Claims, 16 Drawing Sheets

Related U.S. Application Data

(60) Provisional application No. 63/191,464, filed on May 21, 2021.

(56) References Cited

U.S. PATENT DOCUMENTS

| | | | | |
|---|---|---|---|---|
| 8,955,118 | B2 | 2/2015 | Franklin | |
| 9,165,142 | B1 | 10/2015 | Sanders et al. | |
| 10,769,045 | B1 * | 9/2020 | Sharifi Mehr | G06F 21/552 |
| 2002/0166063 | A1 | 11/2002 | Lachman et al. | |
| 2003/0110393 | A1 | 6/2003 | Brock et al. | |
| 2008/0320594 | A1 * | 12/2008 | Jiang | G06F 21/566 726/24 |
| 2015/0295948 | A1 * | 10/2015 | Hassell | H04L 63/1441 726/25 |
| 2018/0004958 | A1 | 1/2018 | Reinecke et al. | |
| 2019/0251260 | A1 * | 8/2019 | Stockdale | H04L 63/1425 |
| 2019/0347143 | A1 | 11/2019 | Carteri et al. | |
| 2020/0311280 | A1 * | 10/2020 | Byrne | G06F 3/0604 |
| 2021/0176260 | A1 | 6/2021 | Pan et al. | |
| 2022/0342988 | A1 | 10/2022 | Brunza et al. | |
| 2024/0129323 | A1 * | 4/2024 | Garyani | G06F 21/554 |

FOREIGN PATENT DOCUMENTS

| | | | |
|---|---|---|---|
| EP | 3343868 | A1 | 7/2018 |
| WO | 2018084808 | A1 | 5/2018 |

OTHER PUBLICATIONS

Jing et al., "Security Data Collection and Data Analytics in the Internet: A Survey", IEEE Communications Surveys & Tutorials, Feb. 21, 2019, pp. 586-618, vol. 21, No. 1.
Bulle et al., "A Host-based Intrusion Detection Model Based on OS Diversity for SCADA", IECON 2020 The 46th Annual Conference Of The Ieee Industrial Electronics Society, IEEE, Oct. 18, 2020, pp. 691-696.
Extended European Search Report for Application No. 22805645.3-1218 issued on Feb. 21, 2025.
Office Action for U.S. Appl. No. 18/512,670 issued on Jun. 17, 2025.
Takai, "Statement by Department of Defense Chief Information Officer Before the House Armed Services Committee Subcommittee on Intelligence, Emerging Threats and Capabilities on DOD Information Technology and Cyber Operations Programs", 2013, 20 pages.
Thabane et al., "A tutorial on pilot studies: the what, why and how", BMC Medical Research Methodology, 2010, 10 pages, vol. 10, No. 1.
Tillman et al., "A professional's guide to decision science and problem solving: An integrated approach for assessing issues, finding solutions, and reaching corporate objectives", 2012, 276 pages, Upper Saddle River, NJ: Pearson Education.
University of Iowa Health Care , "The University of Iowa Department of Pathology laboratory services handbook", Retrieved from https://www.healthcare.uiowa.edu/path_handbook/Appendix/Chem/PRED_VALUE_THEORY.html.
University of Southern California, "USC Libraries research guides", 2017, Retrieved from http://libguides.usc.edu/writingguide/quantitative.
Vella, "The year of the hacker", Cybersecurity: Hacking, the dark web and you, Apr. 2018, Chap. 1, pp. 28-31, New York, NY: Time, Inc.
Ventana Research, "Next-generation predictive analytics: Using forward looking insights to gain competitive advantage", 2015, 10 pages.
Verizon, "2017 data breach investigation report", 10th ed., 2017, 76 pages, Retrieved from http://www.verizonenterprise.com/resources/reports/rp_DBIR_2017_Report_en_xg.pdf.
Walker, "All in one CEH certified ethical hacker, exam guide (4th ed.)", 2019, 935 pages, New York, NY: McGraw-Hill Education.
Wang et al., "Big data analytics for network intrusion detection: A survey", International Journal of Networks and Communications, 2017, pp. 24-31, vol. 7.
Wilshusen, "A better defined and implemented national strategy is needed to address persistent challenges", Report No. GAO-13-462, Washington, DC: U.S. Government Accountability Office, 2013, 36 pages.
Zelle et al., "Cyber liability: It's just a click away", Journal of Insurance Regulation, 2014, 34 pages, vol. 3, No. 6.
Alhello et al., "On applicability of neural network in intrusion detection and prevention", International Journal of Advanced Research in Computer Science, 2017, pp. 494-498, vol. 8, No. 7.
Bencsath et al., "The cousins of Stuxnet: Duqu,Flame, and Gauss", Future Internet, 2012, pp. 971-1003, vol. 4.
Betz, "An analysis of the relationship between security information technology enhancements and computer security breaches and incidents", NSUWorks, 2016, 165 pages.
Birnbaum, "Behavior based analytics for securing cyber-physical systems" (Preview), 2015, 24 pages, Retrieved from ProQuest Theses and Dissertations Database, (UMI No. 3713548).
Blanke, "A study of the contributions of attitude, computer security policy awareness, and computer self-efficacy to the employees' computer abuse intention in business environments" (Preview), 2008, 24 pages, Retrieved from ProQuest Theses and Dissertations Database. (UMI No. 3336919).
Bortniker, "Malware analysis for cyber-threat intelligence" (Preview), 2016, 14 pages, Retrieved from ProQuest Theses and Dissertations Database, (UMI No. 10112473).
Borum et al., Strategic cyber intelligence», Information & Computer Security, 2015, pp. 317-332, vol. 23, No. 3.
Carrascosa et al., «Data Analytics and Decision Support for Cybersecurity: Trends, methodologies and applications, 2017, 279 pages, Belfast, UK: Springer.
Chrissis et al., "CMMI for Development, Guidelines for Process Integration and Product Improvement", 3rd ed., 2011, 657 pages, Boston, MA: Pearson Education.
Creswell et al., "Research Design: Qualitative, Quantitative, and Mixed Method Approaches" 5th ed., 2018, 304 pages, Thousand Oaks, CA: Sage.
Department of Defense, "Task Force Report: Resilient military systems and the advanced cyber threat", Defense Science Board, Jan. 2013, 146 pages.
Erickson, "Hacking: The art of exploitation", 2008, San Francisco, CA: No Starch Press.
Gibson, "CompTIA Security +: Get certified get ahead SY0-501 study guide", 2017, 606 pages, Virginia Beach, VA: You Can Do Anything, LLC.
Glass et al., "Statistical methods in education and psychology", 3rd ed., 2008, 695 pages, Upper Saddle River, NJ: Pearson Education.
Gray et al., "Data fracking strategy: Why management accountants need it", Management Accounting Quarterly, 2015, pp. 22-33, vol. 16, No. 3.
Haas et al., "Data is dead ... without what-if models", Proceedings of the VLDB Endowment, 2011, pp. 1486-1489, vol. 4, No. 12, Retrieved from http://www.vldb.org/pvldb/vol4/p1486-haas.pdf.
Haley, "A theory of cyber deterrence", Georgetown Journal of International Affairs, Feb. 6, 2013, 3 pages.
Heale et al., "Validity and reliability in quantitative research", Evidence-Based Nursing, 2015, pp. 66-67, vol. 18, No. 3.
Holtfreter et al., "Data breach trends in the United States", Journal of Financial Crime, 2015, pp. 242-260, vol. 22, No. 2.
Hua et al., "Variable-stride multi-pattern matching for scalable deep packet inspection", IEEE Infocom, 2009, pp. 415-423.
Hurley, "For and from cyberspace conceptualizing cyber intelligence, surveillance, and reconnaissance", Air & Space Power Journal, 2012, pp. 12-33, vol. 26, No. 6.
International Preliminary Report on Patentability (Chapter I) for PCT/US2022/030402 issued Nov. 21, 2023.
International Search Report for PCT/US2022/030402 dated Nov. 17, 2022.
Ionita et al., "Secure threat information exchange across the Internet of Things for cyber defense in a fog computing environment", Informatica Economica, 2016, pp. 16-27, vol. 20, No. 3.

(56) References Cited

OTHER PUBLICATIONS

Iovan et al., "From cyber threats to cyber-crime", Journal of Information Systems & Operations Management, 2016, pp. 425-434, 10 pages.
Ittmann, "The impact of big data and business analytics on supply chain management", Journal of Transport and Supply Chain Management, 2015, 9 pages, vol. 9.
Kugler, "Deterrence of cyber attacks", Cyberpower and National Security 309, 2009, 26 pages.
Lamorte, "Positive and negative predictive value", Screening for Disease, 2016, 3 pages, Retrieved from http://sphweb.bumc.bu.edu/otlt/MPH-Modules/EP/EP713_Screening/EP713_Screening5.html.
Landon-Murray, "Big data and intelligence: Applications, human capital, and education", Journal of Strategic Security, 2016, pp. 92-121, vol. 9, No. 2.
Leslie et al., "Statistical models for the number of successful cyber intrusions", Journal of Defense Modeling and Simulation: Applications, Methodology, Technology, pp. 1-16, vol. 15, No. 1.
Levesque et al., "Securing cyberspace: Towards an agenda for research and practice", Technology Innovation Management Review, 2015, pp. 26-34, vol. 5, No. 11.
Loy et al., "South Carolina Department of Revenue: Mother of government dysfunctions", Journal of the International Academy for Case Studies, 2014, pp. 83-93, vol. 20, No. 1.
Luszcz, "Apache Struts 2: How technical and development gaps caused the Equifax breach", Network Security, Jan. 2018, pp. 5-8.
Mattern et al., "Operational levels of cyber intelligence", International Journal of Intelligence and CounterIntelligence, 2014, pp. 702-719, vol. 27, No. 4.
Mehresh et al., "Surviving advanced persistent threats in a distributed environment—Architecture and analysis", Information Systems Frontiers, 2015, pp. 987-995, vol. 17.
Mertens, "Research and evaluation in education and psychology: Integrated diversity with quantitative, qualitative, and mixed methods" 4th ed., 2015, 538 pages, Washington DC: Sage.
Messier, "CEH v10: Certified ethical hacker study guide", 2019, 584 pages, Indianapolis, Wiley.
Moustafa et al., "Big data analytics for intrusion detection system: Statistical decision-making using finite Dirichlet mixture models", Data Analytics andDecision Support for Cybersecurity, 2017, pp. 127-156.
National Institute of Standards and Technology, "Glossary of key information security terms" (NISTIR 7298 Revision 2), 2013, 223 pages, Gaithersburg, MD: U.S. Department of Commerce.
Nizami et al., "The reality of cyber security", International Journal for Electronic Crime Investigation, 2017, pp. 11-16, vol. 1, No. 1.
Pfleeger et al., "Security in Computing", 5th ed., 2015, 940 pages, Upper Saddle River, NJ: Pearson Education.
Provost et al., "Data Science for Business", 2013, 403 pages, Sebastopol, CA: O'Reilly Media.
Punithan et al., "A game theoretic model for dynamic configuration of large-scale intrusion detection signatures", Multimedia Tools and Applications, 2016 , pp. 15461-15477, vol. 75.
Rana et al., "A review paper on Linux mitigation & countermeasures against its vulnerabilities", International Journal of Scientific Research in Computer Science, Engineering and Information Technology, 2017, pp. 1269-1274, vol. 2, No. 6.
Ring et al., "A toolset for intrusion and insider threat detection", Data Analytics and Decision Support for Cybersecurity, 2017, pp. 3-31.
Schmarzo, "Understanding Type I and Type II errors", 2013, 14 pages.
Segal, "Accounting frauds: Review of advanced technologies to detect and prevent frauds", Economics and Business Review, 2016, pp. 45-64, vol. 2, No. 16.
Shea, "Moving the ball forward with predictive intelligence", Signal, Dec. 2016, p. 13.
Shiva et al., "Game theory for cyber security", Proceedings of the Sixth Annual Workshop on Cyber Security and Information Intelligence Research, 2010, 5 pages.
Sun et al., "Business analytics-based enterprise information systems", Journal of Computer Information Systems, 2017, pp. 169-178, vol. 57, No. 2.

* cited by examiner

To Figure 8B

CYBERATTACK SIGNATURE GENERATION USING HOST LEVEL DATA ANALYTICS

CROSS-REFERENCE AND PRIORITY CLAIM TO RELATED PATENT APPLICATIONS

This patent application is a continuation of PCT patent application PCT/US2022/30402, designating the United States, filed May 20, 2022, and entitled "Host Level Data Analytics for Cyberattack Detection", which claims priority to U.S. provisional patent application Ser. No. 63/191,464, filed May 21, 2021, and entitled "Host Level Data Analytics for Cyberattack Detection", the entire disclosures of each of which are incorporated herein by reference.

This patent application is also related to U.S. patent application Ser. No. 18/512,670, filed this same day, and entitled "Host Level Data Analytics for Cyberattack Detection", now U.S. Pat. No. 12,541,594, which is a continuation of PCT patent application PCT/US2022/30402, designating the United States, filed May 20, 2022, and entitled "Host Level Data Analytics for Cyberattack Detection", which claims priority to U.S. provisional patent application Ser. No. 63/191,464, filed May 21, 2021, and entitled "Host Level Data Analytics for Cyberattack Detection", the entire disclosures of each of which are incorporated herein by reference.

INTRODUCTION

A conventional approach to the use of data analytics to detect cyberattacks on computer systems has focused on the network footprint of the cyberattack. Accordingly, conventional approaches to cyberattack data analytics perform pattern analyses at the network level of the computer system by focusing their analysis on computer network traffic in and out of a host computer system as denoted by 150 of FIG. 1. Often this analysis will review the sources and destinations of packet traffic in and out of the host computer system 100 and perhaps include deep packet inspection that searches the content of the payloads of such packet traffic. Accordingly, the conventional approach to cyberattack detection looks at activity occurring at the edges of a computer system such as network traffic, network traffic logs, and system events for network and boundary devices to spot anomalies.

However, the inventor believes that improvements are needed in the art so that systems can better detect cyberattacks. Many sophisticated cyberattacks allow malicious actors to sneak past the conventional network level cyber defenses and remain undetected on host computer systems for extended periods while they can gather and pilfer valuable intelligence or data from the host computer system.

To satisfy the need in the art for new approaches to cyberattack detection, the inventor has focused on the internal performance of the host computer system as denoted by 152 in FIG. 1 in order to detect system performance patterns that are indicative of a cyberattack. As used herein, a "cyberattack" refers to an attempt to damage, disrupt, and/or gain unauthorized access to a computer, computer system, or electronic communications network. Examples of cyberattacks include the deployment or installation of malware on a computer system that will operate to extract information, disable access to information, and/or modify system applications without authorization, whether for pecuniary, vandalistic, or other purposes.

Rather than looking at external interactions and characteristics of the host computer system, the inventor has looked internally at changes in the host computer system to develop a technique for analyzing the internal performance of the host computer system to determine if the host computer system is the subject of a cyberattack.

With this approach, a quantitative exploratory analysis of data sets indicative of host computer system performance can help identify resource usage indicators of a cyberattack.

As part of this approach, a baseline of host computer system behavior can be established by collecting system performance data for a host computer system known to be uncompromised by a cyberattack. We can refer to such a host computer system as a normal host computer system. The system performance data collected from the normal host computer system can be referred to as normal system performance data, and it can serve as the baseline control of the host level data analytics. The normal system performance data can include data values over time for a number of different parameters that represent different aspects of the host computer system during operations.

Also, system performance data can be collected from a host computer system known to be compromised by malware as a result of a cyberattack. We can refer to such a host computer system as an attacked host computer system, and the system performance data collected from it can be referred to as attacked system performance data. The attacked system performance data can include data values over time for the same parameters used for the normal system performance data.

A statistical analysis can be performed on the normal system performance data and the attacked system performance data to identify system performance parameters and parameter values that discriminatively correlate to the cyberattack. The values of the various parameters within the normal and attacked system performance data can be evaluated as variables against a positive and negative cyberattack theory. Logistic regression can then identify system indicators that indicate that a cyberattack is present. These system indicators can then serve as a cyberattack signature for the host computer system.

Thereafter, a host computer system with an unknown cyberattack status can have its internal system performance parameters tested against this cyberattack signature to determine whether the host computer system has been compromised by a cyberattack. This host computer system can be referred to as the test host computer system. To accomplish this testing, system performance data can be collected from the test host computer system, and this system performance data can be referred to as test system performance data. The test system performance data can include data values over time for the same system parameters within the attacked system performance data (or at least enough of those system parameters to determine whether there is a match to the cyberattack signature).

The test system parameter data can then be compared with the attack signature to determine whether there is a pattern match between the two. The existence of the match allows for the system to determine that the test host computer system should be reported as positive for the cyberattack. If no match is found, the test host computer system can be reported as negative for the cyberattack.

Through such host level data analytics, the inventor believes that more options will be available for cyberattacks to be readily detected so that countermeasures can be taken. For example, enumeration scans such as Nmap scans and Nessus scans that often form a preliminary phase of a cyberattack can be detected through the use of such host level data analytics. Timely detection of such enumeration cyberattacks can help prevent the losses and damages that could arise from later phases of the cyberattack should the enumeration phase have gone undetected.

Moreover, these techniques can be used with a number of different types of cyberattacks to develop a library of cyberattack signatures corresponding to different types of cyberattacks. The test system performance data can then be compared against any or all of these cyberattack signatures to determine whether the test host computer system has been compromised by a cyberattack.

These and other features and advantages of the invention will be described in greater detail below.

DETAILED DESCRIPTION OF EXAMPLE EMBODIMENTS

Figure 1:
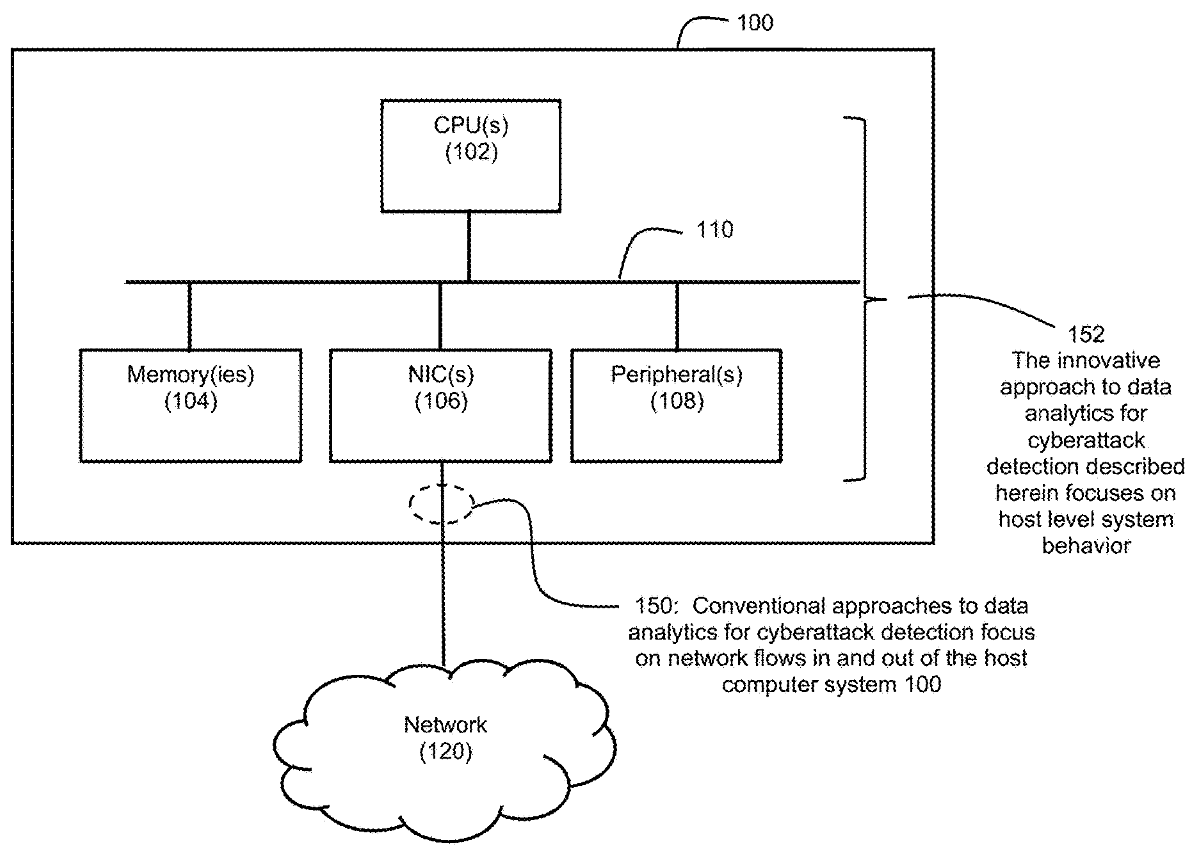
FIG. 1 shows an example host computer system.

FIG. 1 shows an example host computer system 100 that can be used in the practice of an example embodiment of the invention. The host computer system 100 includes one or more processors 102, which can take the form of one or more CPUs or other suitable computer resources. The host computer system 100 also includes one or more memories 104. Memory 104 can store code for execution by the processor(s), such as an operating system (OS), software applications, etc. Memory 104 can also store data for processing by the processor(s) 102 during system operation, such as files, records, etc. The memory(ies) 104 can include random access memory (RAM) devices, disk drives, or other suitable data storage devices. The host computer system 100 can also include one or more network interface cards 106 through which it can communicate with an external network 120 such as the Internet. Further still, the host computer system 100 can include one or more peripherals 108 or other components, such as I/O devices (keyboards, monitors, printers, etc.) among others. These components of the host computer system 100 can be connected with each other and communicate over a system bus 110 or other suitable interconnect technology.

FIG. 1 shows a highly simplified version of a host computer system 100 for the purpose of elaboration, and it should be understood that more complicated system architectures could be deployed. For example, the host computer system 100 could be an IT computer system that hosts a wide variety of services for a number of machines in a distributed network, where such services can include email applications, word processing applications, and/or other business or technical support applications.

Figure 2:
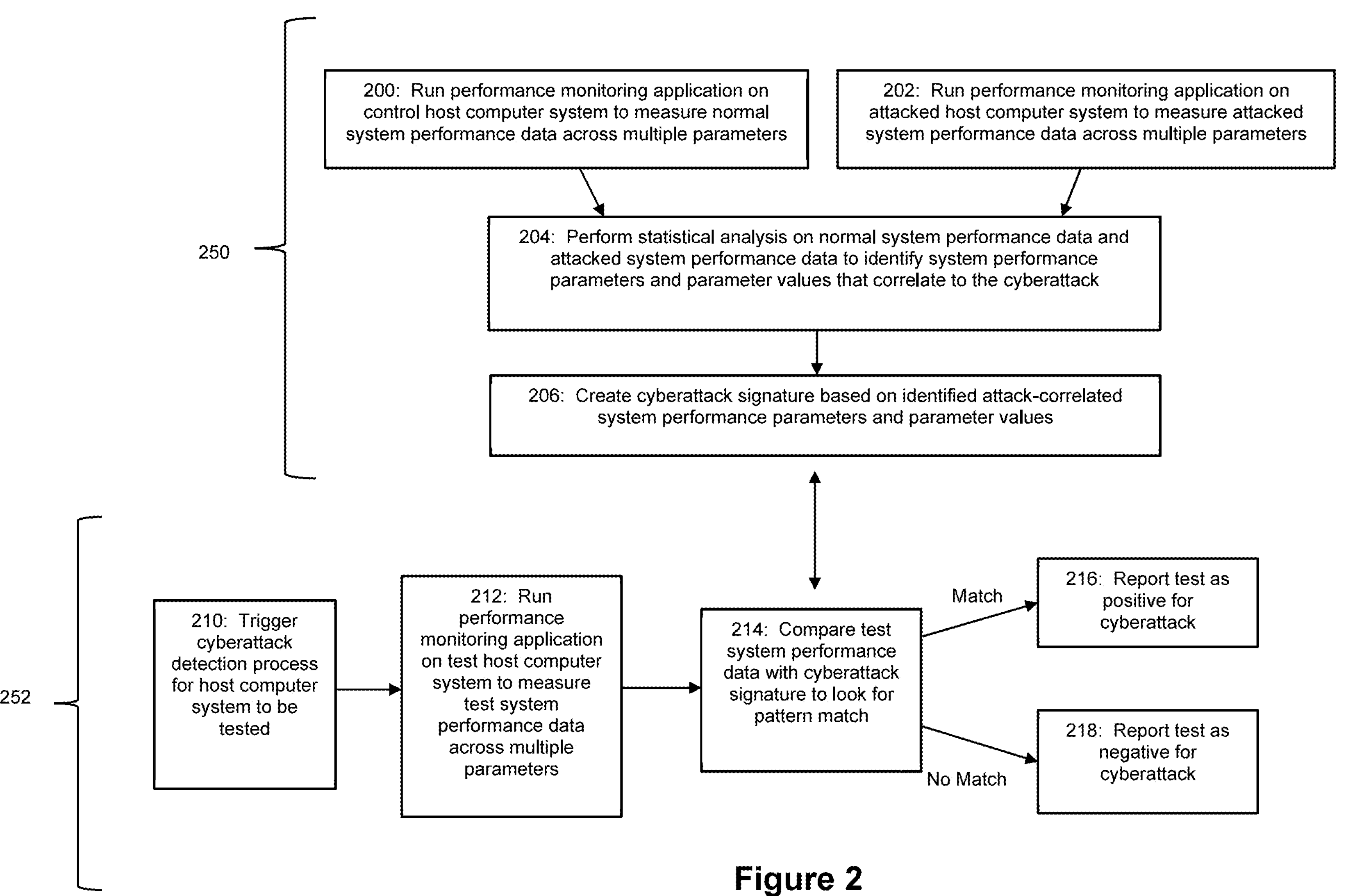
FIG. 2 shows an example process flow for performing host level data analytics to detect a cyberattack.

FIG. 2 shows an example process flow for performing host level data analytics to detect a cyberattack on a host computer system such as the one shown by FIG. 1. The process flow of FIG. 2 can be embodied by machine-readable code that is resident on a non-transitory machine-readable storage medium such as memory 104. The code can take the form of software and/or firmware that define the processing operations discussed herein for execution by the one or more processors 102.

The process flow of FIG. 2 includes an attack signature generation process flow 250 and a cyberattack detection process flow 252. In an example embodiment, these process flows 250 and 252 can be combined in a software application or other processor-executable code. But, if desired by a practitioner, it should be understood that these process flows 250 and 252 could also be implemented by different code such as different software applications. Further still, it should be understood that process flows 250 and 252 need not be carried out in concert with each other or even close in time with each other. For example, process flow 250 could be performed once (or on a relatively infrequent basis) while process flow 252 could be run multiple times (on a relatively more frequent basis).

Generating Attack Signatures Via Host-Level Data Analytics

Steps 200-206 of the attack signature generation process flow 250 operate to apply host level data analytics to one or more host computer systems 100 to generate an attack signature that can be used by the cyberattack detection process flow 252.

At step 200, the normal/control host runs a performance monitoring application to measure its performance over time across a number of different host system parameters. This measured data can be referred to as normal system performance data as discussed above. Examples of host system parameters that can be monitored at step 200 can include any combination of the following:

- CPU usage. Examples of CPU usage parameters can include measurements of processor switching (e.g., processor switching per unit of time such as seconds) and measurements of processor interrupts (e.g. interrupts per unit of time such as seconds), measurements of CPU usage by the operating system (e.g., system percentage (Sys %)), and/or measurements of CPU usage by user applications (e.g., user percentage (User %)).
- Power consumption. An example of a power consumption parameter can include measurements of power consumed per unit of time, etc. for host-level system peripherals and/or system resources.
- Random access memory (RAM) usage. Examples of RAM usage parameters can include measurements of RAM allocation (e.g., memory used versus memory free, etc.)
- Network card usage. Examples of network card usage parameters can include measurements of incoming network packets (e.g., counts, sizes, etc.) and/or measurements of network traffic (e.g. traffic volume per unit of time (such as input/output KB/s, etc.))
- Elapsed time for user processes. An example of a measurement of elapsed user process time parameters can include a measurement of the number of user processes per unit of time such as seconds.
- CPU behavior. CPU behavior parameters can include any patterns in one or more CPU usage parameters over time. For example, a CPU behavior parameter can be a measurement of a deviation in processor switching per unit time, process interrupts per unit time, system percentage, and/or user percentage relative to baseline values for same. Significant and/or sudden spikes in CPU usage as reflected by the CPU behavior can be used as a factor in detecting a cyberattack.

Power behavior. Power behavior parameters can include any patterns in one or more power consumption parameters over time. For example, a power behavior parameter can be a measurement of a deviation in power consumed per unit time relative to a baseline value for same. Significant and/or sudden spikes in power usage as reflected by the power behavior can be used as a factor in detecting a cyberattack.

RAM behavior. RAM behavior parameters can include any patterns in one or more RAM usage parameters over time. For example, a RAM behavior parameter can be a measurement of a deviation in memory allocation relative to a baseline value for same. Significant and/or sudden spikes in memory allocation as reflected by the RAM behavior can be used as a factor in detecting a cyberattack.

Network card behavior. Network card behavior parameters can include any patterns in one or more network card usage parameters over time. For example, a network card behavior parameter can be a measurement of a deviation incoming network packets and/or incoming/outgoing network packets relative to baseline values for same. Significant and/or sudden spikes in network card usage as reflected by the network card behavior can be used as a factor in detecting a cyberattack.

User behavior. User behavior parameters can include any patterns in one or more elapsed user process timing parameters over time. For example, a user behavior parameter can be a measurement of a deviation in user processes per unit time relative to a baseline value for same. Significant and/or sudden spikes in user processes or applications running on the system by users (which may include unknown users and/or unknown user processes) as reflected by the user behavior can be used as a factor in detecting a cyberattack.

It should be understood that these are just examples of host system parameters that can be collected, and a practitioner may choose to use more, fewer, and/or different host system parameters when generating attack signatures. Moreover, a practitioner can choose suitable durations for measurements of such host system parameters based on experience and the needs for detecting any particular type of cyberattack. These host system parameters can then serve as features whose feature values are evaluated to find a suitable set of features whose feature values correlate to the dependent outcome (namely, the presence of the cyberattack). Logistical regression and model fitting can be used to identify feature coefficients for an identified set of host system parameters for use in a model that models the detection of the cyberattack in terms of the host system parameters of the subject feature set.

A practitioner should choose how long of a duration the normal system performance data should cover based on an estimation of how much time coverage is needed to be able to discriminate normal operating system behaviors from abnormal operating system behaviors. A time period such as 10 minutes or longer can be used. However, it is understood that some practitioners may find longer or shorter periods desirable and/or sufficient.

At step 202, the attacked host runs the performance monitoring application to measure its performance over time across a number of different host system parameters. This measured data can be referred to as attacked system performance data as discussed above. The host system parameters that are collected from the attacked host at step 202 can include the same system parameters discussed above for step 200 as the purpose of the two collections at steps 200 and 202 is to compare the attacked host's internal operational behavior versus the normal host's internal operational behavior so that attack indicators can be detected based on differences in the data sets that discriminately correlate to the cyberattack.

For step 202, the host computer system 100 could be subjected to any of a number of different types of cyberattacks. For example, enumeration scans are often used by bad actors as a preliminary phase of a cyberattack where the bad actor attempts to surveil the host and learn its structure so it can be probed for security flaws or weaknesses. With an enumeration scan, processes are run that extract user names, machine names, network resources, and other services present on a host computer system. This information can then be leveraged by bad actors in carrying out later phases of cyberattacks. Examples of enumeration scan tools that can be used in such enumeration cyberattacks include Network Mapper (Nmap) and Nessus. Nmap is an open source network scanner used to discover hosts and services on a computer network by sending packets and analyzing the responses. Nessus is a proprietary scanner that operates in a similar fashion. Thus, in an example embodiment, the host computer system 100 can be attacked with an Nmap scanner and/or Nessus scanner, and step 202 will operate to monitor system performance while the Nmap scanner and/or Nessus scanner are operating within the host system.

However, it should be understood that cyberattacks other than enumeration attacks can be employed at step 202. The inventor expects that the FIG. 2 process flow can operate with respect to any type of cyberattack that produces attacked system performance data that exhibits sufficient differences from the normal system performance data so that the cyberattack can be detected using the techniques discussed below.

Any of a number of different performance monitoring applications can be used to perform steps 200 and 202. An example of a suitable performance monitoring application is Nmon. Nmon is an open source monitoring application that collects system performance data for every second of a specified duration of time from a computer system with respect to system parameters such as the ones discussed above. For example, Nmon can record data from a Linux host system that is specific to system parameters such as CPU performance, internal system processes, memory, disk usage, system resources, file systems, and network card activity. Nmon data files can be collected from the host computer system 100 and imported into a suitable application for analysis (such as an IBM Nmon spreadsheet and analyzer).

Another example of a suitable performance monitoring application is CollectI. CollectI is a lightweight command-line utility that collects system hardware and software data every second for a specified duration of time from a computer system with respect to system parameters such as the ones discussed above. For example, CollectI can record data from a host system that is specific to system parameters such as CPU performance, internal system processes, disk usage, file systems, memory, network card activity, and network protocols. CollectI data files can be collected from the host computer system 100 and imported into a suitable application for analysis (e.g., imported as a text file in Microsoft Excel or other spreadsheet program where the data can be graphed and assessed for patterns and changes.

Yet another example of a suitable performance monitoring application is Monitorix. Monitorix is a software application designed to monitor system resources and services in Linux operating systems, and it can display the performance output in a web browser. Monitorix operates to monitor and record data over time specific to CPU usage, power, memory, network cards, network traffic, internal system processes, and system users. Monitorix data files can also be imported into suitable software applications for analysis.

It should be understood that steps 200 and 202 may operate by running multiple performance monitoring applications on the host computer system 100 if desired. For example, a practitioner might find it useful to run both Nmon and CollectI on the host computer system 100 to collect the normal system performance data and the attacked system performance data.

Moreover, it should also be understood that steps 200 and 202 can operate on clones of the host computer system 100 rather than directly on the host computer system itself. Accordingly, step 202 (and step 200 if desired by a practitioner) can also include creating a clone of the host computer system 100, and then running the performance monitoring application(s) on the cloned host. Through such cloning, a practitioner can avoid the need to attack the host computer system 100 itself.

At step 204, the system performs a statistical analysis on the normal system performance data and the attacked system performance data. Based on this statistical analysis, system performance parameters and parameter values that correlate to the cyberattack can be identified. These system parameters and parameters values can serve as system indicators of the cyberattack.

Through this statistical analysis, positive and negative infection theories can be tested against the different parameters and parameter values of the normal and attacked system performance data. With a positive predictive value theory, probability statistics can be used to confirm positive signs of a cyberattack. With a negative predictive value theory, a conclusion can be reached that a cyberattack has not occurred because the system indicators did not reach a defined threshold for positively concluding that a cyberattack has occurred. Logistic regression analysis can be used to identify system parameters and parameter values that serve as indicators that the cyberattack has occurred or will occur.

In doing so, a logistic regression model can be developed that models the probability of a cyberattack in terms of a set of features and corresponding feature coefficients. The features can be host system parameters that correlate to the presence of a cyberattack based on a comparative statistical analysis of the known normal system performance data and the known attacked system performance data.

With positive and negative predictive value theory, a practitioner can test the probability of a cyberattack being present (positive) and the probability of a cyberattack not being present (negative) using the logistic regression analysis. A positive predictive value theory can be used to identify host system parameters and parameter values that signal the presence of a cyberattack, and a negative predictive value theory can be used to identify host system parameters and parameter values that signal the lack of a cyberattack.

A practitioner can use the positive and negative predictive value theories to test the probability of a cyberattack on a host computer system by analyzing combinations of the host system parameters for signs or indications of a cyberattack (e.g., performance surges, spikes, or anomalies that have been found to be highly correlated to a cyberattack). The positive and negative predictive value theories also allow for host-level system data analytics to test if a system provides indications that the system is positively or negatively compromised. Applying positive and negative predictive value theory to evaluate systems performance data could provide practitioners with performance monitoring results to confirm the positive or negative probability of a possible cyberattack.

Using the Positive Predictive Value confirms positive signs of a cyberattack by providing the probability statistics for host-level systems. The Negative Predictive Value demonstrates that a cyberattack has not occurred because the host-level system indicators do not reach the threshold of a positive result (e.g., performance surges, spikes, or anomalies that are sufficiently correlated to a cyberattack) on host-level systems, thereby confirming the system is not under attack. The use of logistic regression testing against the positive and negative predictive value theory leads to the probability that a host system is under cyberattack by calculating against a positive or negative value and providing a percentage and indication that the system has been compromised, while reducing the potential amount of false-positive cyberattack identifications.

A tool such as IBM SPSS can be used to provide the statistical analysis of the normal and attacked system performance data sets. However, it should be understood that this need not be the case as other tools for statistical analysis of data sets could be employed if desired by a practitioner.

It should be understood that the process flow 250 may need to iterate through steps 200, 202, and 204 a number of times in order to reliably identify and validate the system indicators of the cyberattack.

The cyberattack system indicators identified by step 204 can then be used to create a cyberattack signature at step 206. This cyberattack signature comprises a plurality system indicators which can be expressed in terms host system parameters and corresponding parameter values (which may include ranges of parameter values) that serve to characterize the existence of the cyberattack on the host system. In this fashion, the cyberattack signature serves to represent the cyberattack in terms of its measurable and quantifiable impact on various host system parameters.

The cyberattack signature can be stored in memory 104 for later access when testing the host computer system 100 to determine whether a cyberattack has occurred.

Detecting Cyberattacks Using Host-Level Cyberattack Signature

Steps 210-218 of the cyberattack detection process flow 252 operate to apply host level data analytics to test the host computer system 100 and determine whether the host computer system 100 has been compromised by the cyberattack corresponding to the cyberattack signature created at step 206.

At step 210, the system triggers the cyberattack detection process flow 252 to run on the host computer system 100. This host computer system 100 can be referred to as the test host computer system. This trigger can be configured to run on a periodic basis or an event basis as may be desired by a practitioner. For example, a practitioner may choose to run the cyberattack detection process flow 252 every X minutes (e.g., 10 minutes) or other time basis (such as hourly, daily, weekly, etc.). Moreover, the time periods encompassed by the cyberattack detection process 252, when repeated, can be overlapping time periods. The extent of the overlap can depend on the time duration nature of the cyberattack signature. For example, if the cyberattack signature requires a 2 minute window of data values in order to detect the cyberattack from the host's system parameters, then a practitioner may want to use time periods that overlap by two minutes (or a bit more) when repeating the detection process 252. This can help ensure that cyberattacks that may occur near the time-wise edges of the detection processes 252 are not missed. As another example, step 210 can trigger the cyberattack detection process flow 252 in response to a user request or some other event-driven basis.

In another example embodiment, the system can run the cyberattack detection process 252 on a continuous basis, in which case the need for a trigger step 210 can be obviated. In a continuous operating mode, the system will effectively be constantly looking through a sliding window of system performance data from the test host computer system to determine whether a cyberattack is indicated.

At step 212, the system runs the performance monitoring application(s) used at steps 200 and 202 on the test host computer system to measure its performance over time across a number of different host system parameters. The system performance data generated at step 212 can be referred to as test system performance data. As discussed above with respect to steps 200 and 202, the system parameters for which data is collected at step 212 can include system parameter measurements that are indicative of any of the following:

CPU usage
Power consumption
Random access memory (RAM) usage
Network card usage
Elapsed time for each process
CPU behavior
Power behavior
RAM behavior
Network card behavior
User behavior Thus, the test system performance data can include a plurality of host system parameters and their corresponding values over time during operation of the test host computer system. If desired, a practitioner can limit the monitoring and collection at step 212 to just those system parameters that are needed to evaluate whether the cyberattack signature is present therein.

The time period for the collection can be a duration sufficiently long to permit the detection of a cyberattack in view of the cyberattack signature; and a practitioner may want to set the time period for collection at step 212 in concert with the trigger frequency for step 210 so that the detection process 252 can operate on all time periods for the host (and thus avoid the risk of omitting a time period where a cyberattack might occur and be undetected).

As discussed above, examples of performance monitoring applications that can be used at step 212 include Nmon, CollectI, and/or Monitorix.

At step 214, the system compares the test system performance data with the cyberattack signature to determine whether there is a pattern match. This comparison can involve comparing the characteristics of the cyberattack signature against a sliding window of the test system performance data to determine whether there is any portion of the test system performance data that matches the cyberattack signature.

If step 214 results in a match being found between a portion of the test system performance data and the cyberattack signature, then the process flow can proceed to step 216, where the system reports the test host computer system as positive for the cyberattack. This report can trigger an alert on a user interface of a system administrator or other user responsible for protecting the security of the host computer system 100. The system can then provide the user with access to a log that provides data describing the detected cyberattack such as an identification of a time where the cyberattack was detected and the portion of the test system performance data that triggered the match. This can allow the user to take appropriate remedial measures if the positive report is deemed accurate.

If step 214 results in no match being found between the test system performance data and the cyberattack signature, then the process flow can proceed to step 218, where the system reports the test host computer system as negative for the cyberattack. The negative result can be logged by the system to enable the system administrator or other user to audit the test outcomes and review their associated data characteristics if desired.

Accordingly, it should be understood that FIG. 2 describes a technique for using host-level data analytics to detect a cyberattack in terms of its impact on the host's operational performance as compared to the control baseline of the host's normal operational performance when not subject to the cyberattack.

Figure 3:
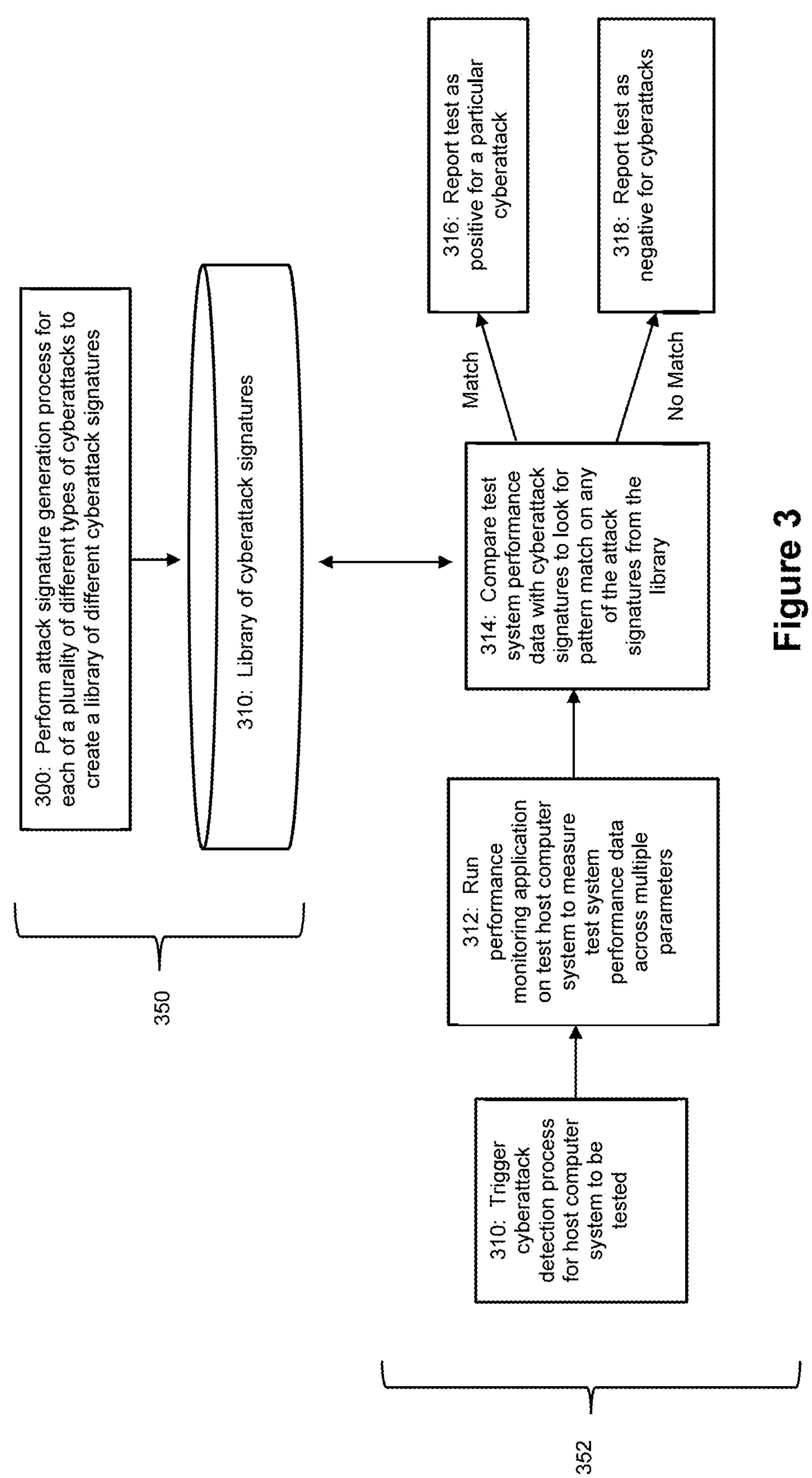
FIG. 3 shows an example process flow for performing host level data analytics to detect any of a plurality of different types of cyberattacks.

Detecting Multiple Types of Cyberattacks Via a Library of Cyberattack Signatures In another example embodiment, the FIG. 2 process flow can be extended to provide a capability of testing a host computer system for any of multiple different types of cyberattacks. FIG. 3 shows an example process flow for this. The process flow of FIG. 3 can be embodied by machine-readable code that is resident on a non-transitory machine-readable storage medium such as memory 104. The code can take the form of software and/or firmware that define the processing operations discussed herein for execution by the one or more processors 102.

The process flow of FIG. 3 includes a process flow 350 for generating multiple cyberattack signatures and a cyberattack detection process flow 352 that works in concert with the multiple attack signatures. In an example embodiment, these process flows 350 and 352 can be combined in a software application or other processor-executable code. But, if desired by a practitioner, it should be understood that these process flows 350 and 352 could also be implemented by different code such as different software applications. Further still, it should be understood that process flows 350 and 352 need not be carried out in concert with each other or even close in time with each other. For example, process flow 350 could be performed once (or on a relatively infrequent basis) while process flow 352 could be run multiple times (on a relatively more frequent basis).

Process flow 350 includes a step 300 which involves performing steps 200-206 from FIG. 2 for a plurality of different types of cyberattacks. This results in the creation of a plurality of different cyberattack signatures, where each cyberattack signature has a corresponding cyberattack type. These cyberattack signatures can then be stored in memory 104 as a library 310 of cyberattack signatures. For example, with reference to enumeration cyberattacks as discussed above, step 300 can include (1) running steps 200-206 with respect to an Nmap enumeration cyberattack to generate a cyberattack signature for the Nmap enumeration cyberattack and (2) running steps 200-206 with respect to a Nessus enumeration cyberattack to generate a cyberattack signature for the Nessus enumeration cyberattack. By adding the Nmap and Nessus cyberattack signatures to the library 310, the system can be capable of detecting the existence of either of these types of cyberattacks via process flow 352.

Process flow 352 includes steps 310, 312, 314, 316, and 318 that are similar in nature to corresponding steps 210, 212, 214, 216, and 218 of FIG. 2. Thus, step 310 can operate in a similar fashion as step 210, and step 312 can operate in a similar fashion as step 212. However, it should be understood that the system parameters for which data is collected from the test host computer system at step 312 should be at least the superset of all system parameters that are needed to evaluate all of the cyberattack signatures in the library 310. Step 314 can operate in a similar fashion as step 214, although the matching process can be run against the test system performance data with respect to each of a plurality of the cyberattack signatures in the library 310. Accordingly, if any matches are found from step 314, then step 316 can report the test host computer system as positive for a cyberattack. Moreover, based on knowledge of which cyberattack signature triggered the match, the system can also report the type of cyberattack that was detected. As discussed above, a user interface can be provided through which a system administrator or other user can evaluate the positive hit. Moreover, should matches on multiple cyberattack signatures be found at step 314, each of these positive matches can be reported out at step 316. If none of the cyberattack signatures from the library 310 are found to be a match at step 314, then step 318 can report out the negative result as discussed above.

Accordingly, FIG. 3 describes a technique for using host-level data analytics to detect any of multiple types of cyberattacks in terms of their impact on the host's operational performance as compared to the control baseline of the host's normal operational performance when not subject to cyberattack.

The inventor believes that the process flows of FIGS. 2 and/or 3 can be used by themselves as cybersecurity applications for computer system or they can be used in concert with other cybersecurity applications such as the network-level data analytics discussed above that are well-known in the art. In this fashion, a cybersecurity dashboard can be provided that evaluates a wide number of different aspects of the host system including its external traffic characteristics as well as its internal operating characteristics in order to detect anomalies that may indicate the presence of a cyberattack.

Example Embodiments—Detecting Nmap and Nessus Enumeration Attacks on a Red Hat Enterprise Linux System In an example embodiment, the host computer system 100 can be a Red Hat Enterprise Linux (RHEL) system, which is a common host system used in commercial and government sectors, and the cyberattack can be an Nmap enumeration cyberattack. In experimentally testing the cyberattack detection techniques described herein on RHEL systems with respect to Nmap enumeration cyberattacks, the inventor has found that the host-level data analytics described herein can accurately detect an Nmap enumeration cyberattack on the RHEL system.

In this example, the performance monitoring applications that can be used at steps 200, 202, and 212 can be the Nmon and/or CollectI performance monitoring applications. Appendix A included herewith describes an example procedure for running collections on the RHEL host systems using Nmon and CollectI to collect normal and attacked system performance data and then evaluating the results to find anomalies that correlate to the cyberattack and which can be used as a cyberattack signature.

Running the process flow 250 with respect to an Nmon system collection and an Nmap enumeration cyberattack across 20 instances of virtual machines for an RHEL system revealed increases in system activity and resource usage during the enumeration scan times on 15 of the RHEL systems. The 15-test positive virtual machines all logged increases in resource usage for inbound network packets to the network interface card, central processor usage, process switching per second, and processor interrupts specific to the time when Nmap scans occurred. Both Nmon and CollectI graphed findings display these increases in system activity and resource usage in the entire test positive virtual machine systems specific to data captured for inbound network packets for the network interface card, central processor usage, process switching per second, and processor interrupts. These graphed indications correlated to Nmap scan times and were recorded in both Nmon and CollectI. The documented increases in activity and graphed results confirmed the test positive designation for those virtual machines.

The indication of a Nmap enumeration scan recorded in both Nmon and CollectI was a single five to eight second increase of activity for inbound network packets, process switching per second, processor usage, and an increase in processor interrupts. Accordingly, these characteristics discriminatively correlate with an Nmap enumeration cyberattack on an RHEL system that runs Nmon and/or CollectI to gather relevant system performance data.

In another example embodiment, the RHEL system can be subjected to a Nessus enumeration cyberattack. In experimentally testing the cyberattack detection techniques described herein on RHEL systems with respect to Nessus enumeration cyberattacks, the inventor has found that the host-level data analytics described herein can accurately detect a Nessus enumeration cyberattack on the RHEL system.

In this example, the performance monitoring applications that can be used at steps 200, 202, and 212 can be the Nmon and/or CollectI performance monitoring applications. Running the process flow 250 with respect to an Nmon system collection and a Nessus enumeration cyberattack across 20 instances of virtual machines for an RHEL system (along with 5 additional Nmon collection and 5 additional CollectI collection retests) revealed increases in system activity and resource usage during the enumeration scan times on 15 of the RHEL systems. The 15-test positive virtual machines all logged increases in resource usage for inbound network packets to the network interface card, central processor usage, process switching per second, and processor interrupts specific to the time when Nessus scans occurred. The graphed attack indicators for Nessus scans related to test positive systems were also recorded in both Nmon and CollectI data. Theses graphed indications correlated to Nessus scan times and were recorded in both the Nmon and CollectI data sets. The documented increases in activity and graphed results confirmed the test positive designation for those virtual machines.

The indication of a Nessus enumeration scan recorded in both Nmon and CollectI was a single six second increase of activity followed by an eight second time frame of normal activity followed by another single six second increase of activity for inbound network packets, process switching per second, processor usage, and an increase in processor interrupts. Accordingly, these characteristics discriminatively correlate with a Nessus enumeration cyberattack on an RHEL system that runs Nmon and/or CollectI to gather relevant system performance data.

These experiments exposed similar system indications recorded on both Nmon and CollectI data files that correlate to Nmap and Nessus enumeration cyberattacks. In particular, these experiments exhibited the following performance metrics for using Nmon and CollectI data collections to detect Nmap and Nessus enumeration scans:

Sensitivity=75%, where sensitivity is the percentage of hosts that test positive when an attack is present. Thus, the testing sensitivity provides the percentage of hosts that displayed a measurable effect from the Nmap and Nessus enumeration cyberattacks that the host-level data analytics was able to discriminate.

Specificity=100%, where specificity is the percentage of machines that have not been attacked and test negative. Thus, the specificity percentage represents the probability of true negatives and allows for false positives to be distinguished.

Predictive Value of Positive Result=100%; and Predictive Value of Negative Result=100%, where predictive value is a measurement of probability that a positive or negative result is considered true. Thus, predictive value was the level of accuracy with which an outcome could be predicted, and the predictive value percentage allows for the elimination of false negatives in order to accurately predict test positives or test negatives.

Test Efficiency=87.5%, where test efficiency is the percentage of hosts that rendered correct results versus the total number of hosts tested. Test efficiency provides a measurement of the number of correct results versus the total number of tests conducted and the percentage of hosts under test the provided capability to measurably detect the cyberattack.

Figure 4:
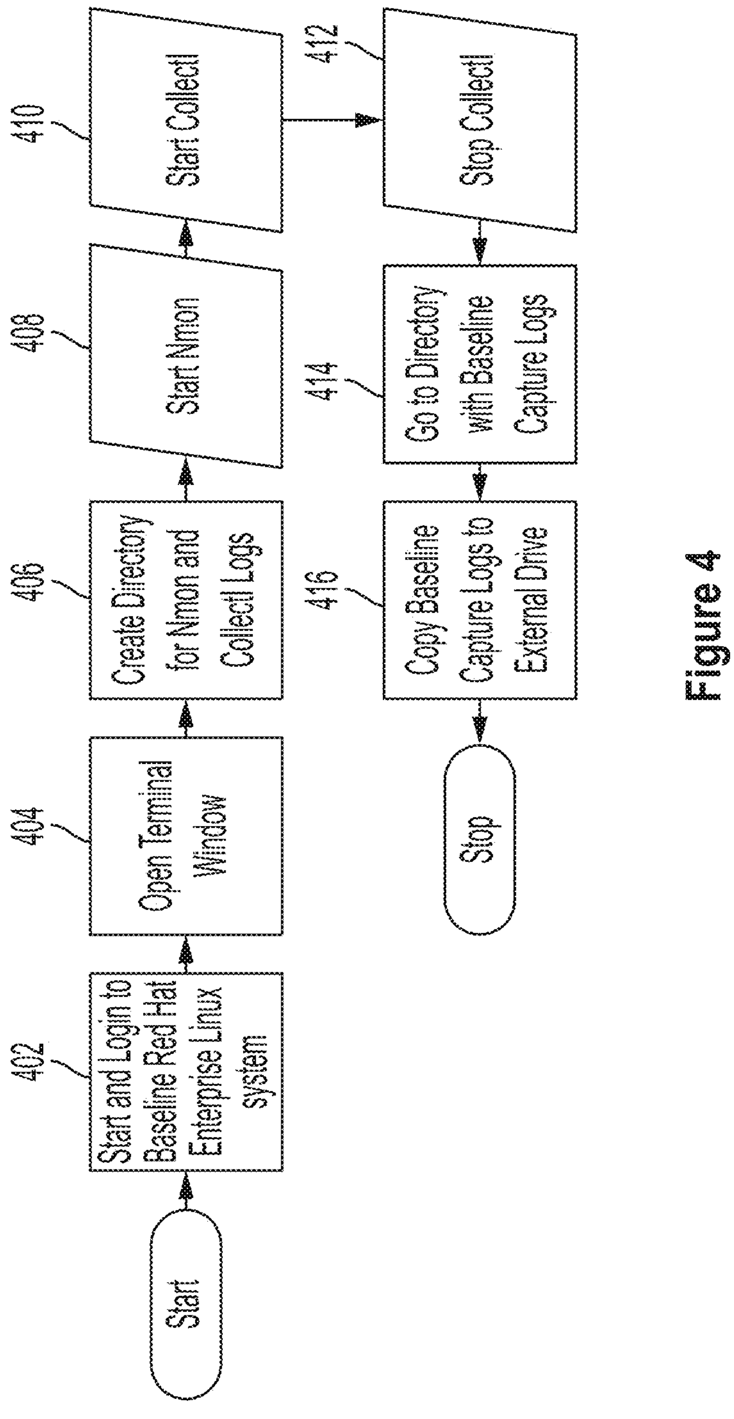
FIGS. 4-10 show additional example process flows for performing host level data analytics in connection with host computer systems for example embodiments.

FIG. 4 shows a process flow for the baseline data capture in connection with this testing of RHEL host systems using Nmon and CollectI applications. This process flow results in the generation of the normal system performance data as discussed above in connection with FIGS. 2 and 3. At step 402, the user logs in to the baseline RHEL host system. At step 404, a terminal window is opened. At step 406, a directory for Nmon and CollectI logs is created. Nmon and CollectI can then be started (steps 408 and 410, where step 412 indicates stopping the CollectI application). The directory with the baseline capture logs is then accessed (step 414) and copied to an external drive (or another location) for processing/analysis (step 416).

Figure 5:
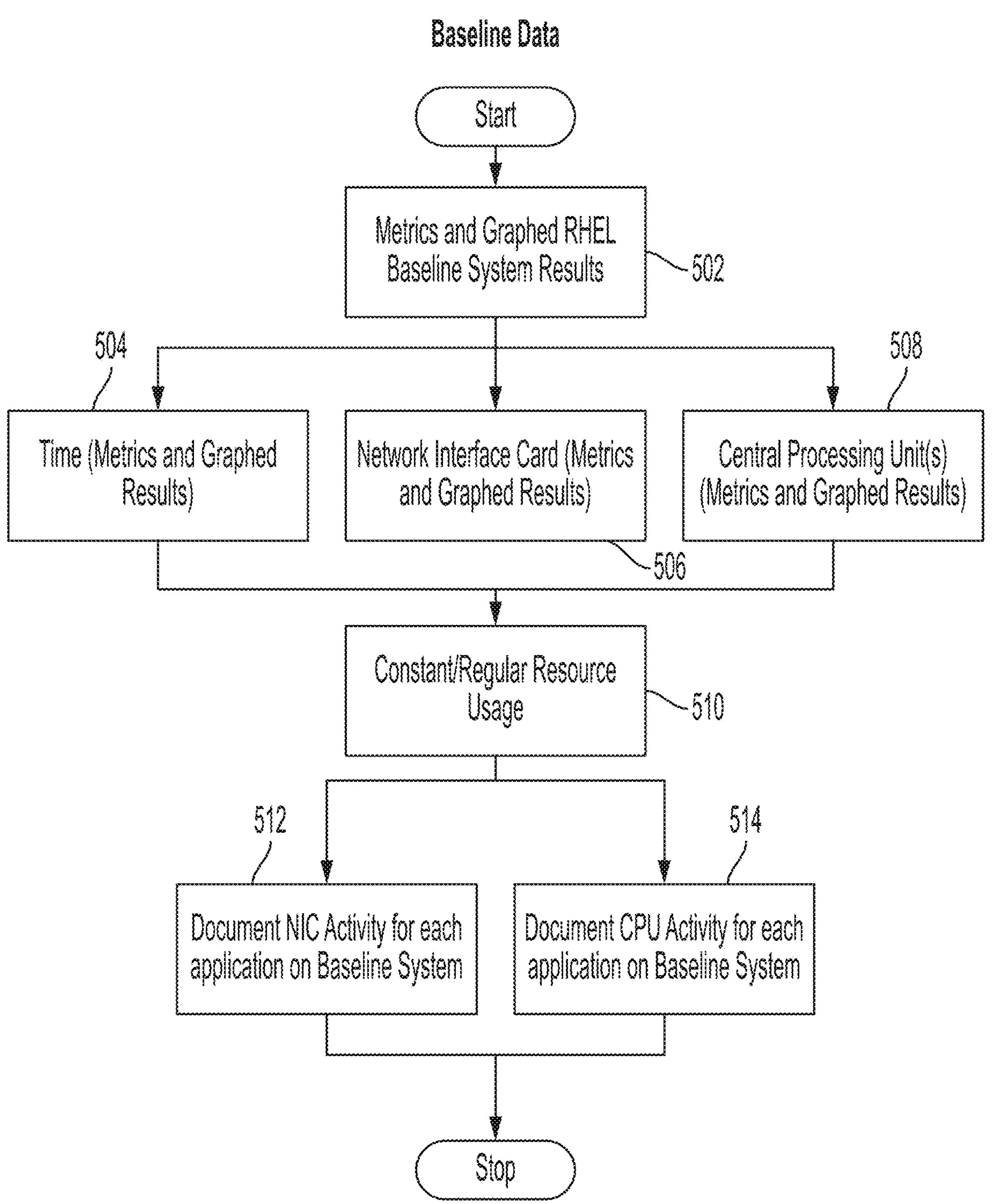

FIG. 5 shows a process flow where the collected baseline metrics (which may comprise metrics and graphed RHEL baseline system results from the collection process of FIG. 4—see 502) include time data (see 504), NIC activity data (see 506), and CPU activity data (see 508). This baseline data is then processed and analyzed to establish the patterns for constant/regular resource usage (step 510). From this baseline data, the system can document the baseline NIC activity for each application on the baseline RHEL system (step 512) and document the baseline CPU activity for each application on the baseline RHEL system (step 514).

Figure 6:
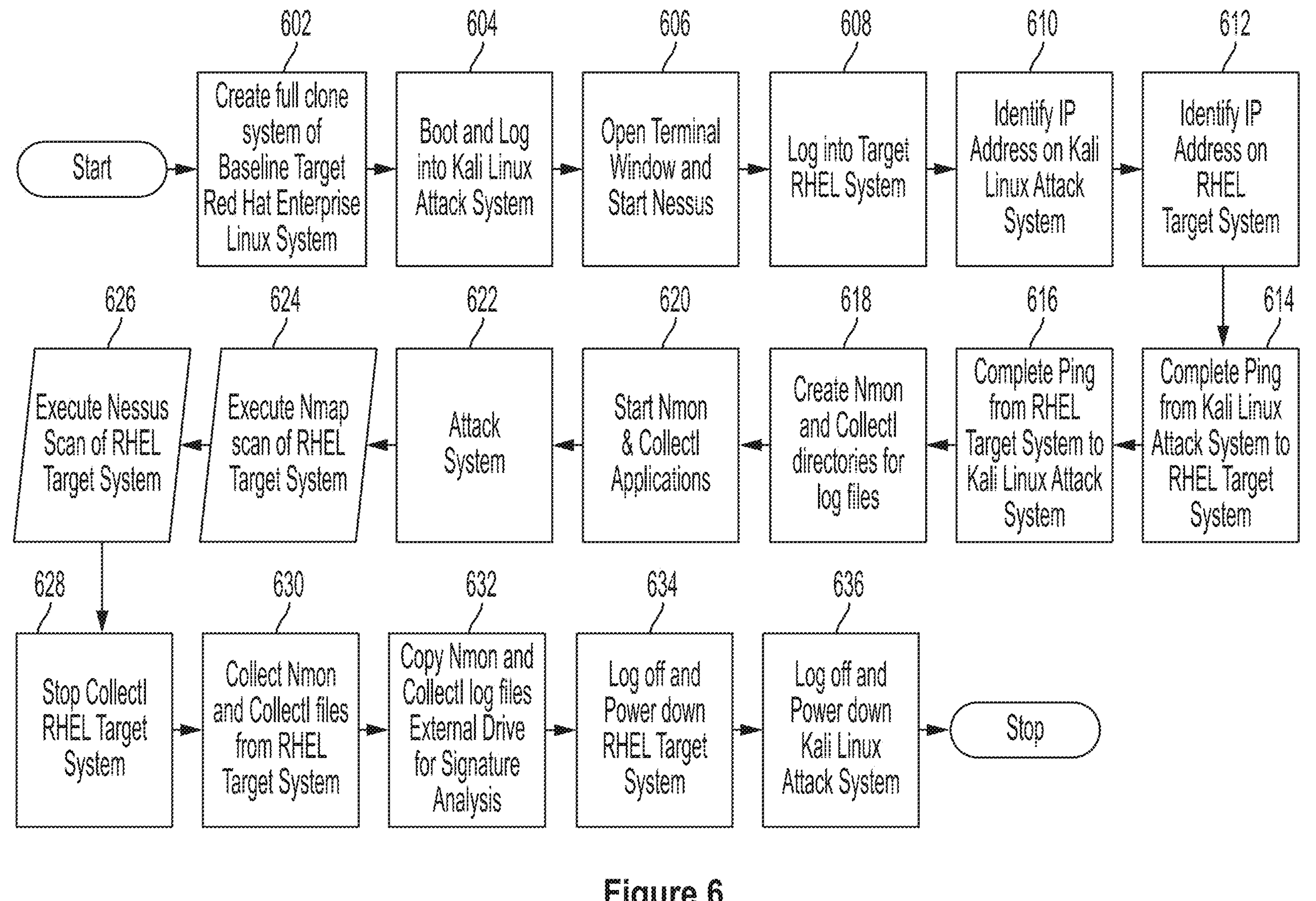

FIG. 6 shows a process flow for data capture relating to the Nmap and Nessus cyberattacks on the RHEL host systems that are running Nmon and CollectI applications. This process flow results in the generation of the attacked system performance data as discussed above in connection with FIGS. 2 and 3. At step 602, a full clone of the baseline RHEL system is created, and this clone can then serve as the target RHEL system. At step 604, the attack system (e.g., a *Kali* Linux attack system) is booted and logged into. At step 606, a terminal window on the attack system is opened and Nessus is started. At step 608, the target RHEL system is logged into. The IP addresses of the attack system and the target RHEL system are then identified (see steps 610 and 612), and pings between the attack system and target RHEL system are completed to ensure they can communicate with each other (see steps 614 and 616). At step 618, Nmon and CollectI directories are created for the log files from the Nmon and CollectI collections. The Nmon and CollectI applications are then started on the target RHEL system (step 620). The attack system can then begin its attack on the target RHEL system (step 622), which can include executing the Nmap scan of the target RHEL system (step 624) and executing the Nessus scan of the target RHEL system (step 626). It should be understood that these attacks can be performed at separate times for different collections if desired by a practitioner. These attacks occur while the target RHEL system is being monitored by the running Nmon and CollectI applications, where step 628 indicates stopping the CollectI application. The directories with the capture log files is then accessed (step 630) and copied to an external drive (or another location) for processing and analysis to develop attack signatures (step 632). The target and attack systems can then be logged off from and powered down (steps 634 and 636).

Figure 7:
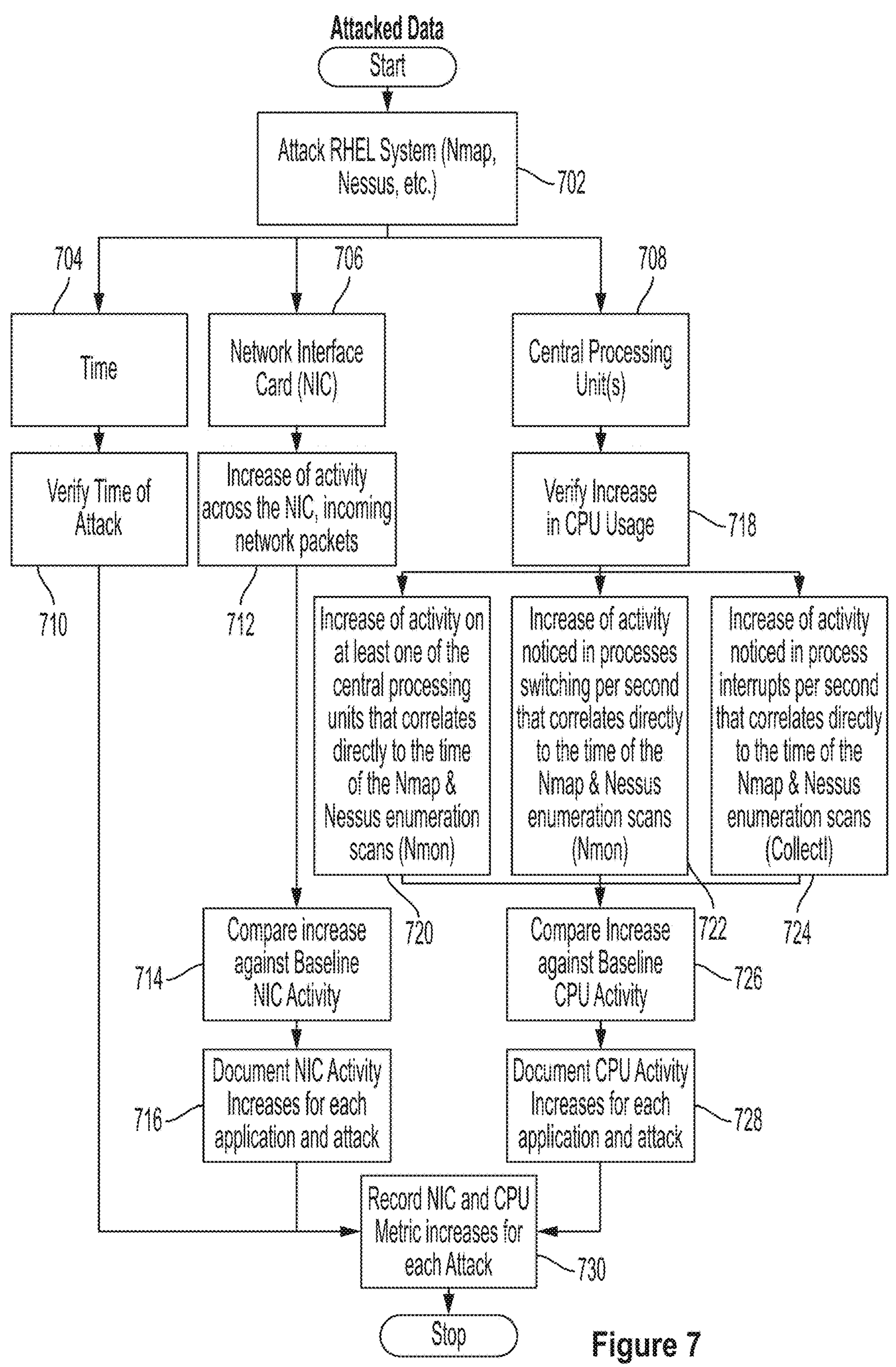

FIG. 7 shows a process flow where the collected attack metrics 702 include time data (see 704), NIC activity data (see 706), and CPU activity data (see 708). The time information 704 allows for the timing of the cyberattack to be verified (see step 710) and used for correlation with the measurements of NIC activity and CPU activity. At step 712, the system can determine if there is an increase in activity across the NIC (such as incoming network packets) that is correlated to the verified time of attack. The correlated NIC activity within the attacked system performance data can be compared with the normal/baseline NIC activity from step 512 (see step 714) to document any changes (e.g., increases in NIC activity arising from attack) for each application and attack (see step 716). The system can also perform similar operations with respect to the CPU activity data. At step 718, the system can determine if there is an increase in CPU usage that is correlated to the verified time of attack. This CPU usage can be measured via an increase of activity on at least one of the CPUs that correlates to the time of the Nmap and Nessus enumeration scans as applicable (derived from Nmon collection data), as shown by 720. This CPU usage can also be measured via an increase of activity in processes switching per second that correlates to the time of the Nmap and Nessus enumeration scans as applicable (derived from Nmon collection data), as shown by 722. This CPU usage can also be measured via an increase of activity in processor interrupts per second that correlates to the time of the Nmap and Nessus enumeration scans as applicable (derived from CollectI collection data), as shown by 724. The correlated CPU usage activity within the attacked system performance data can be compared with the normal/baseline NIC activity from step 514 (see step 726) to document any changes (e.g., increases in NIC activity arising from attack) for each application and attack (see step 728). These changes in NIC and CPU activity can be recorded/documented for use in generating attack signatures (see 730).

Figure 8A:
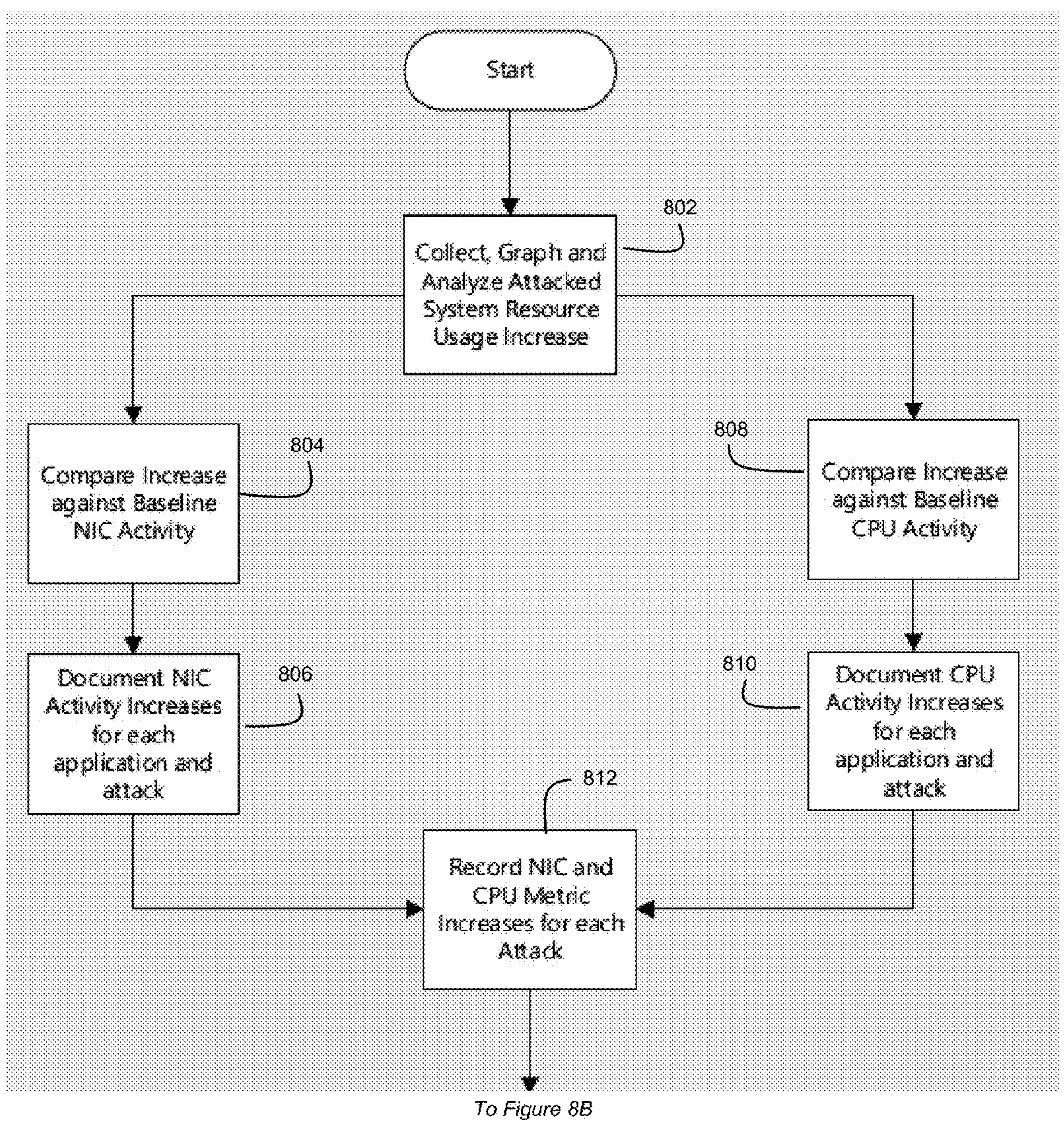
Figure 8B:
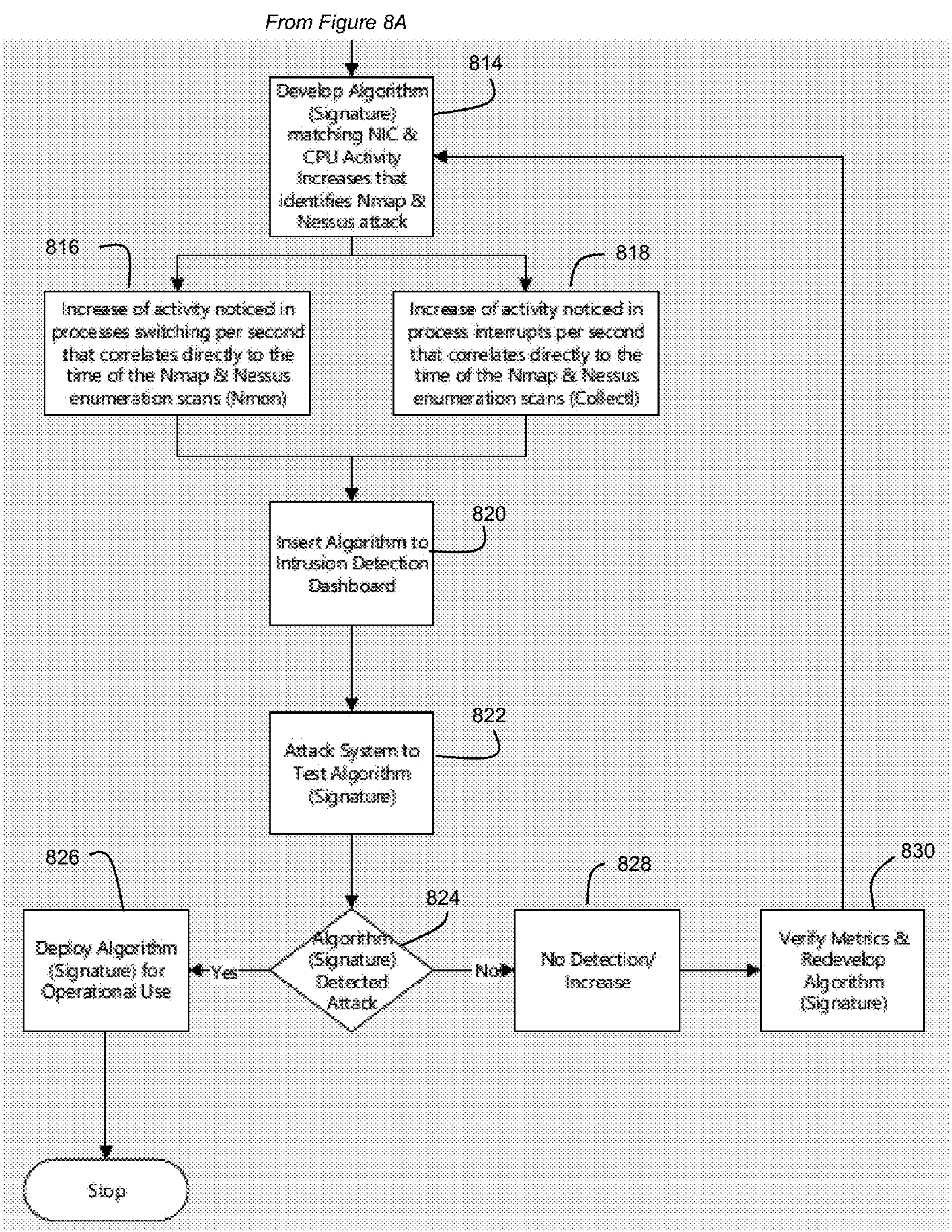

FIGS. 8A and 8B show a process flow for generating a cyberattack signature corresponding to the Nmap and Nessus scans based on the Nmon and/or CollectI data sets collected from the RHEL host systems. For example, at step 802, the system can collect, graph, and analyze the resource usage increases documents for the attacked system. In this example, the system parameters used for discrimination are NIC activity (e.g., measurements of inbound packet activity) and CPU activity (e.g., processor switches (processor interrupts) per second), and the process flow can compare the values for these system parameters in the attacked system performance data versus the normal/baseline system performance data (see 804 and 808 for NIC activity and CPU activity respectively). The changes (e.g., increases in activity in this case) can then be quantified, documented, and recorded (see 806 and 810 for NIC activity and CPU activity respectively). Thus, the system can record NIC activity and CPU activity metric increases for each attack (see 812). Nmap and Nessus attack signatures can then be developed from correlations of these system parameters to the attacks, which can then be tested and updated over time to improve performance (see 814). The attack signature can be based on features and feature values for the NIC and CPU activity that are found to be indicative of the Nmap and/or Nessus attacks. For example, the features and feature values can include features and feature values representing an increase of activity in terms of processes switching per second that correlate to the time of the Nmap and Nessus attacks as applicable (as shown by 816) and an increase of activity in terms of processor interrupts per second that correlate to the time of the Nmap and Nessus attacks as applicable (as shown by 818), where the signature may include threshold values for such increases as well as time windows for such activities, including timing relative to other measured activities as observed in the system performance data. In another example embodiment, the attack signature can be represented by an algorithm that defines how system performance data can be tested to determine whether its features and feature values match the attack pattern. Once an attack signature is developed, it can be inserted into an intrusion detection dashboard for an attack monitoring application (see 820). Thereafter, this attack signature can be tested against new attacks on the RHEL system (step 822) to assess how well it performs in detecting known attacks (step 824). If the attack signature performs suitably well according to performance metrics defined by a practitioner, then the attack signature can be deployed for operational use (step 826). For example, the defined performance metrics may require steps 822 and 824 to accurately detect attacks with high accuracy (e.g., 90%, 95%, 100%, etc.). If steps 822 and 824 do not produce adequate results (such as failing to detect a known attack (see 828), then the system can adjust the signature in an iterative manner until an attack signature is developed that performs suitably well (see 830).

Figure 9:
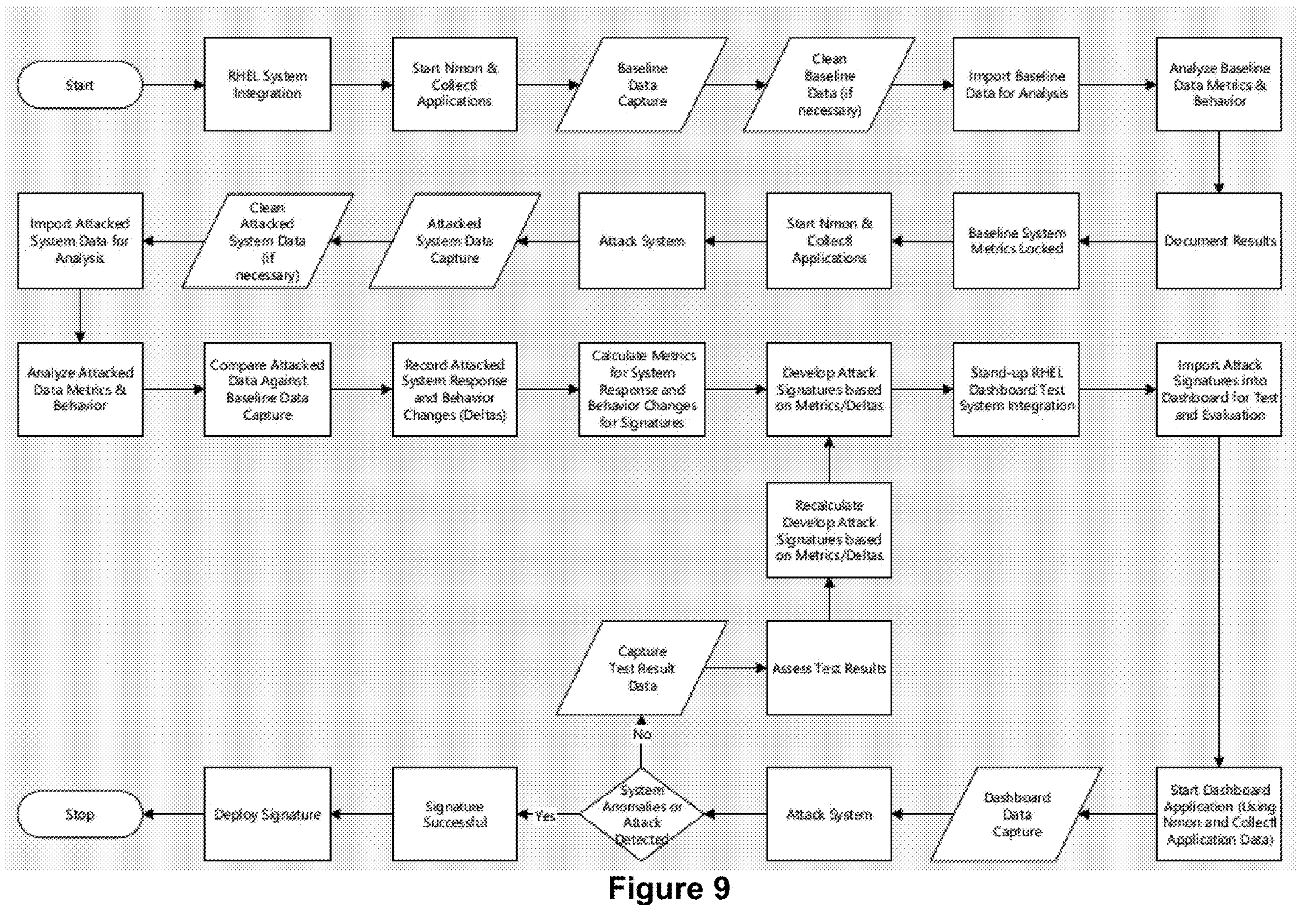

FIG. 9 shows an overall process flow that combines baseline collection and attack collections along with attack signature generation, where successfully tested attack signatures can then be deployed for operational detections.

Figure 10:
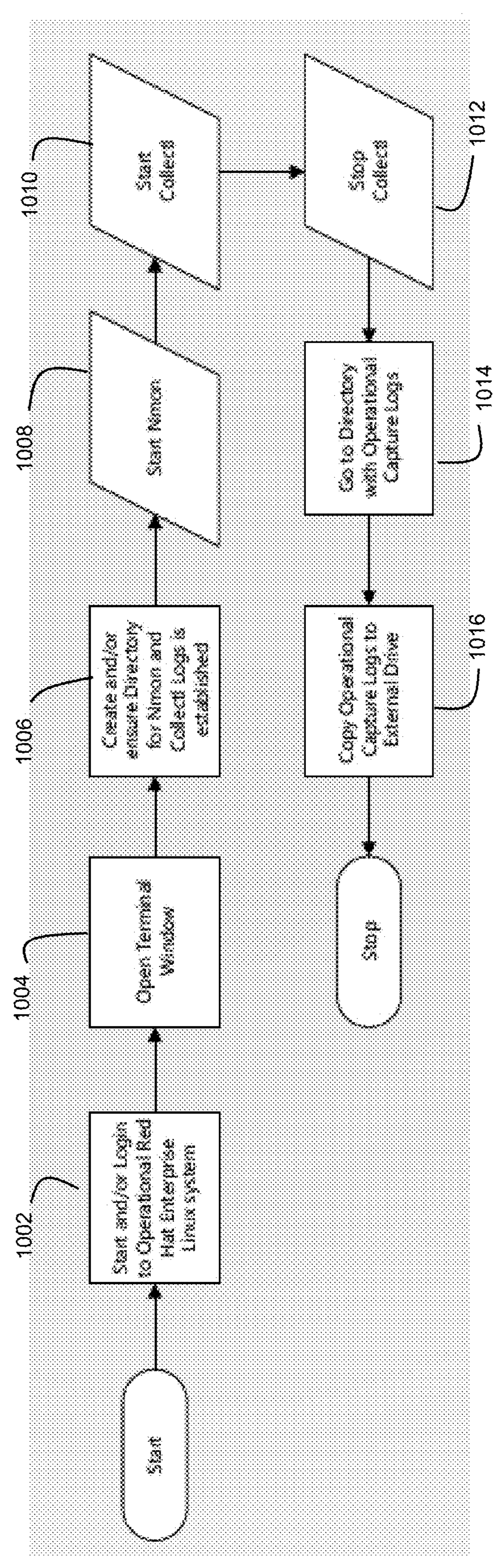

FIG. 10 shows another process flow for collecting system performance data from the operational RHEL host system to be tested for attacks. This process flow results in the creation of the test system performance data discussed above in connection with FIGS. 2 and 3. Steps 1002, 1004, 1006, 1008, 1010, 1012, 1014, and 1016 of FIG. 10 generally correspond to steps 402, 404, 406, 408, 410, 412, 414, and 416 respectively of FIG. 4, albeit where the RHEL system is the operational system for which cyberattack monitoring is to be performed based on the operational attack signature deployed as a result of step 826 of FIG. 8B.

Figure 11:
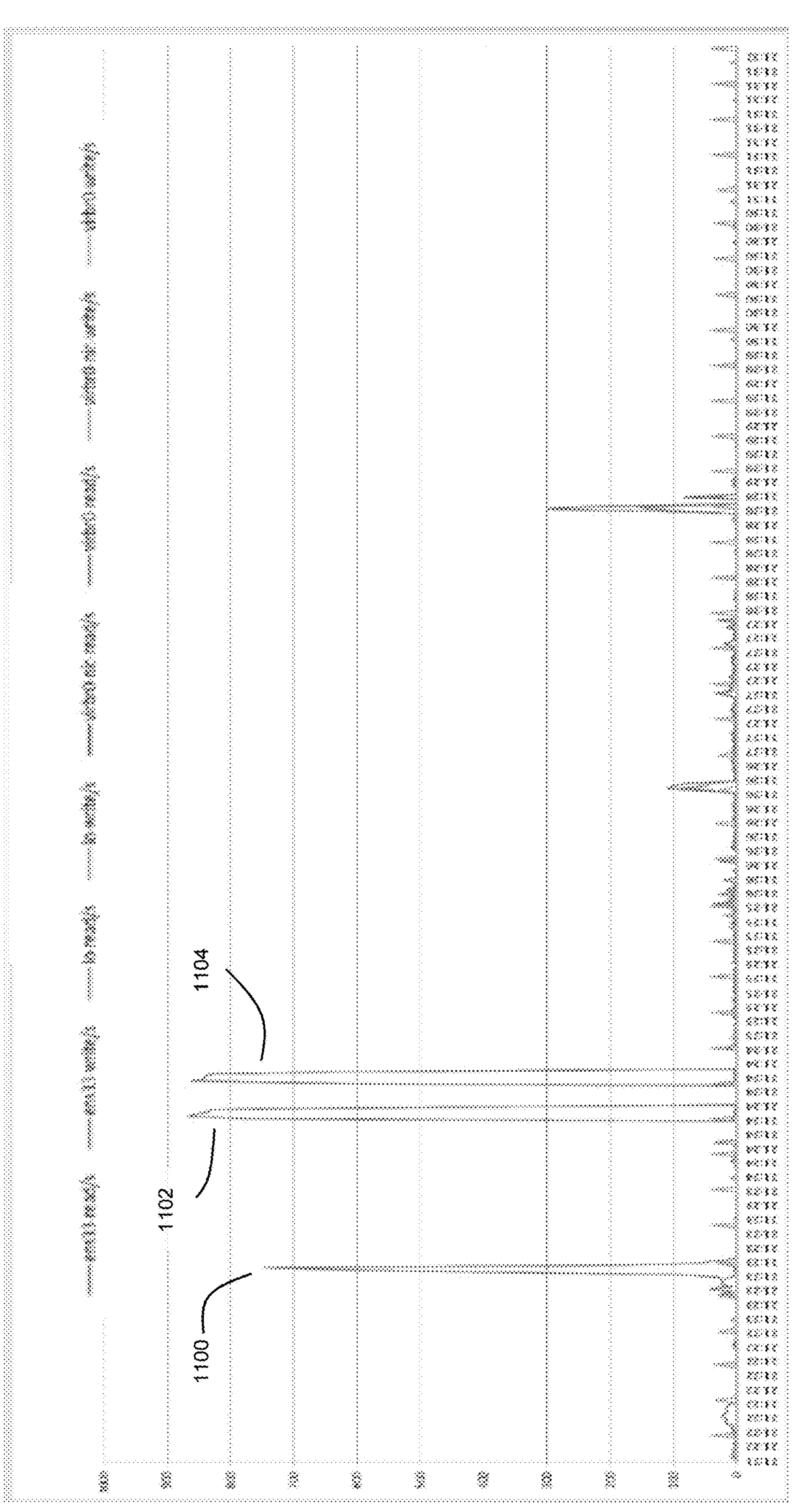
FIGS. 11-15 show example plots of collected system performance data that can indicate the presence of Nmap and Nessus enumeration cyberattacks.

FIG. 11 shows a plot from an IBM Nmon analyzer that was captured using the Nmon application from a tested RHEL host system when the system was attacked with Nmap and Nessus scans (and while the RHEL host system was running Nmon, CollectI, and Monitorix applications to monitor performance). The plot of FIG. 11 shows captured performance data specific to the NIC of the RHEL host system, and the spikes 1100, 1102, and 1104 show increases in Ethernet card read activity. The X-axis is time (and equal to the 10 minute test period for each system), and the X-axis is activity. The first spike 1100 correlates directly to the Nmap scan time. Then, around a minute later there are two other noticeable spikes 1102 and 1104 that correlate directly to the Nessus scan start time.

Figure 12:
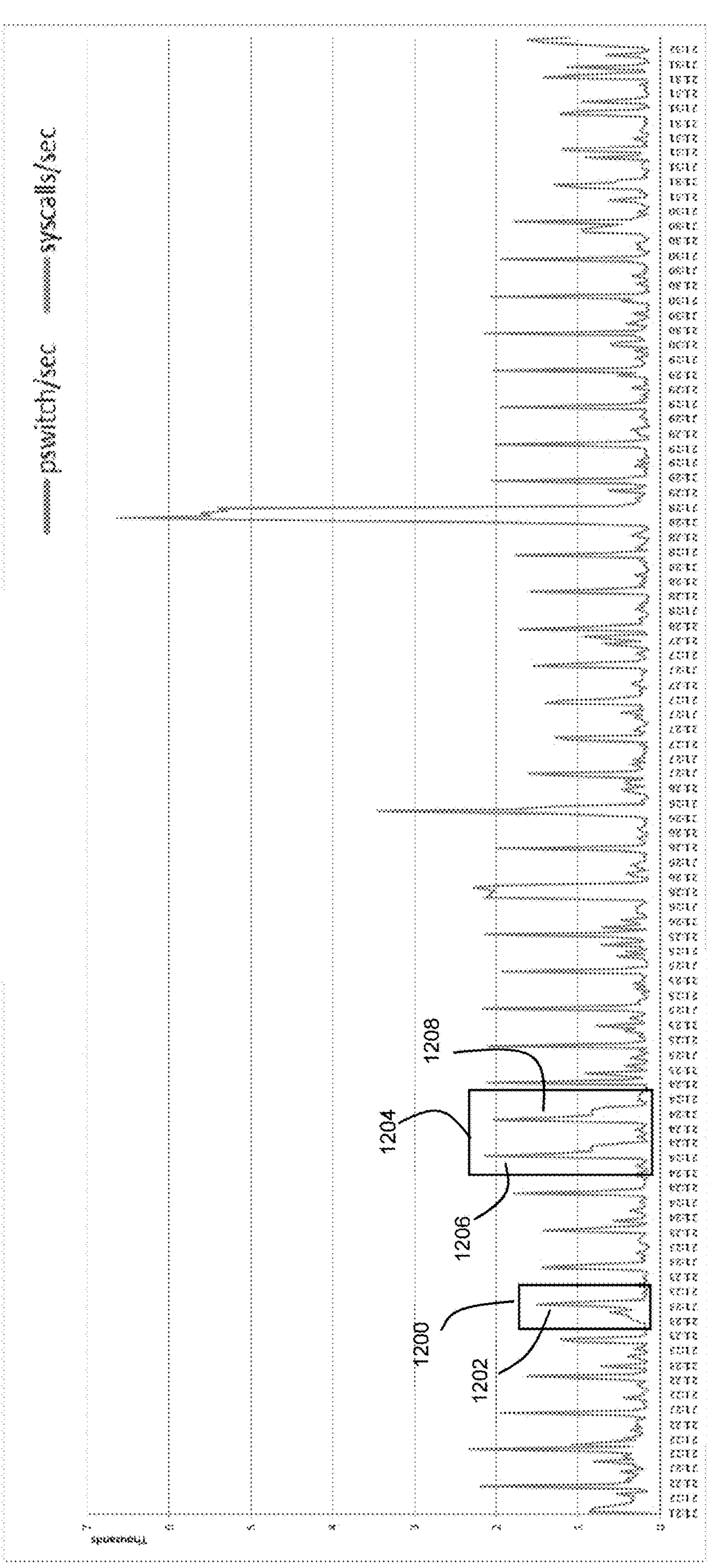

FIG. 12 shows another plot from an IBM Nmon analyzer that was captured using the Nmon application from a tested RHEL host system when the system was attacked with Nmap and Nessus scans (and while the RHEL host system was running Nmon, CollectI, and Monitorix applications to monitor performance). The plot of FIG. 12 covers the same time period and the same host system as the plot of FIG. 11, but where the plot of FIG. 11 shows captured performance data specific to CPU activity of the tested system in terms of processing switching activity (processor interrupts) per second. Box 1200 is around a noticeable spike 1202 that correlates to the Nmap scan time. Box 1204 is around 2 spikes 1206 and 1208 around one minute later that correlates to the Nessus scan time.

Figure 13:
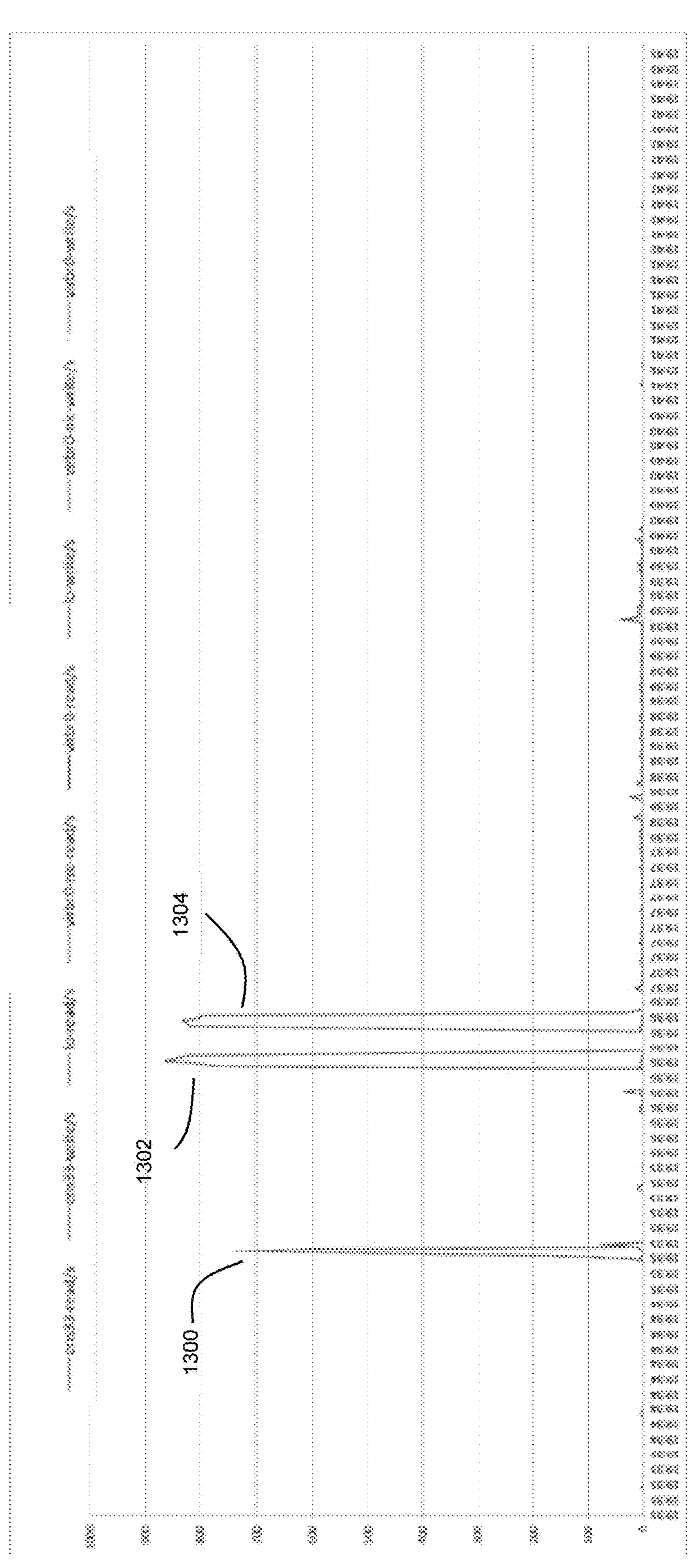

FIG. 13 shows a plot from an IBM Nmon analyzer that was captured using the Nmon application from a re-tested RHEL host system when the system was attacked with Nmap and Nessus scans (and while the RHEL host system was running only Nmon to monitor performance). The plot of FIG. 13 shows captured performance data specific to the NIC of the RHEL host system, and the spikes 1300, 1302, and 1304 show increases in Ethernet card read activity. The X-axis is time (and equal to the 10 minute test period for each system), and the X-axis is activity. The first spike 1300 correlates to the Nmap scan time. Then, around a minute later there are two other noticeable spikes 1302 and 1304 that correlate directly to the Nessus scan start time.

Figure 14:
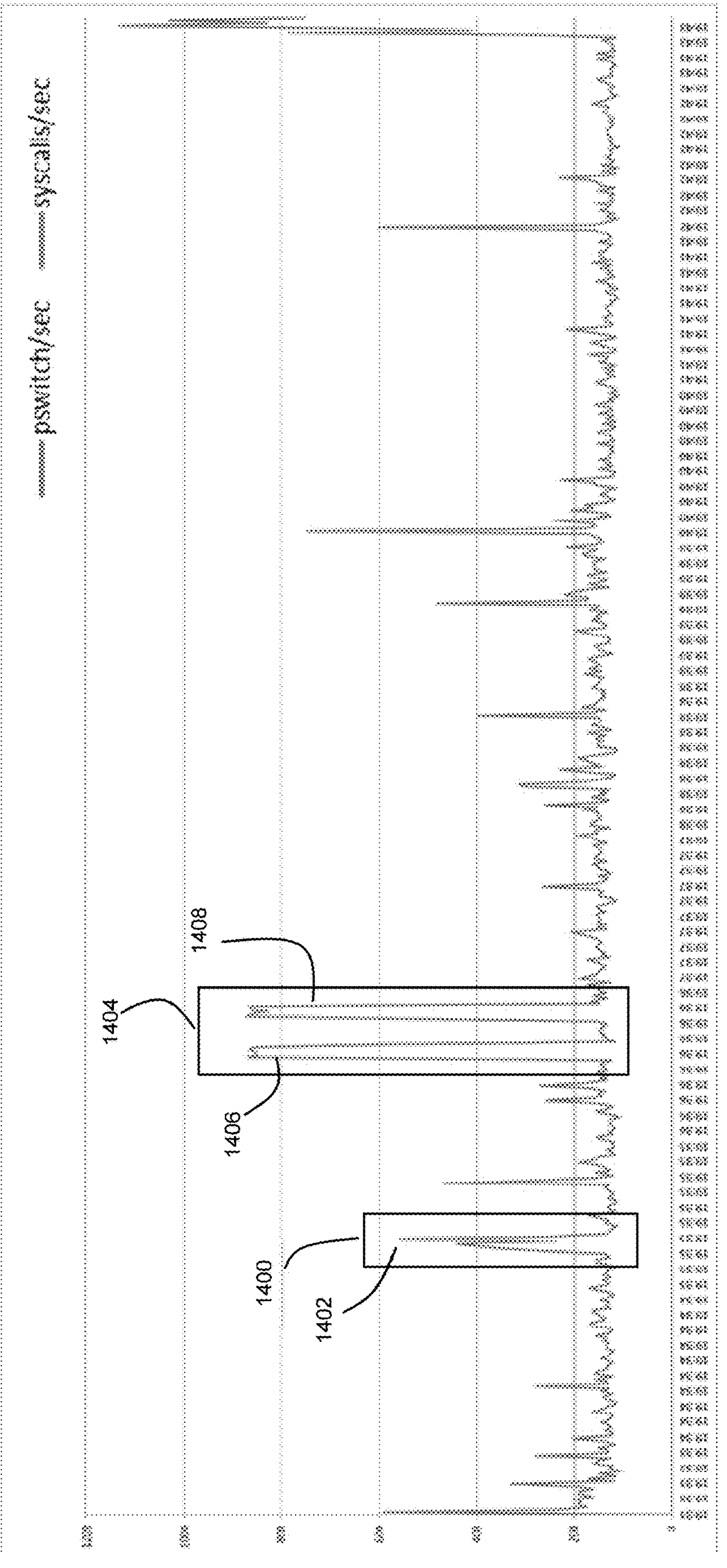

FIG. 14 shows another plot from an IBM Nmon analyzer that was captured using the Nmon application from the re-tested RHEL host systems of FIG. 13 when the system was attacked with Nmap and Nessus scans (and while the RHEL host system was running only Nmon to monitor performance). The plot of FIG. 14 covers the same time period and the same host system as the plot of FIG. 13, but where the plot of FIG. 14 shows captured performance data specific to CPU activity of the tested system in terms of processing switching activity (processor interrupts) per second. Box 1400 is around a noticeable spike 1402 that correlates to the Nmap scan time. Box 1404 is around 2 spikes 1406 and 1408 around one minute later that correlates to the Nessus scan time.

Systems that demonstrated such noticeable and positive increases in Nmon data for Ethernet card read activity and processor switching activity per second as reflected by the plots of FIGS. 11-14 can be marked as test positive during analysis.

Figure 15:
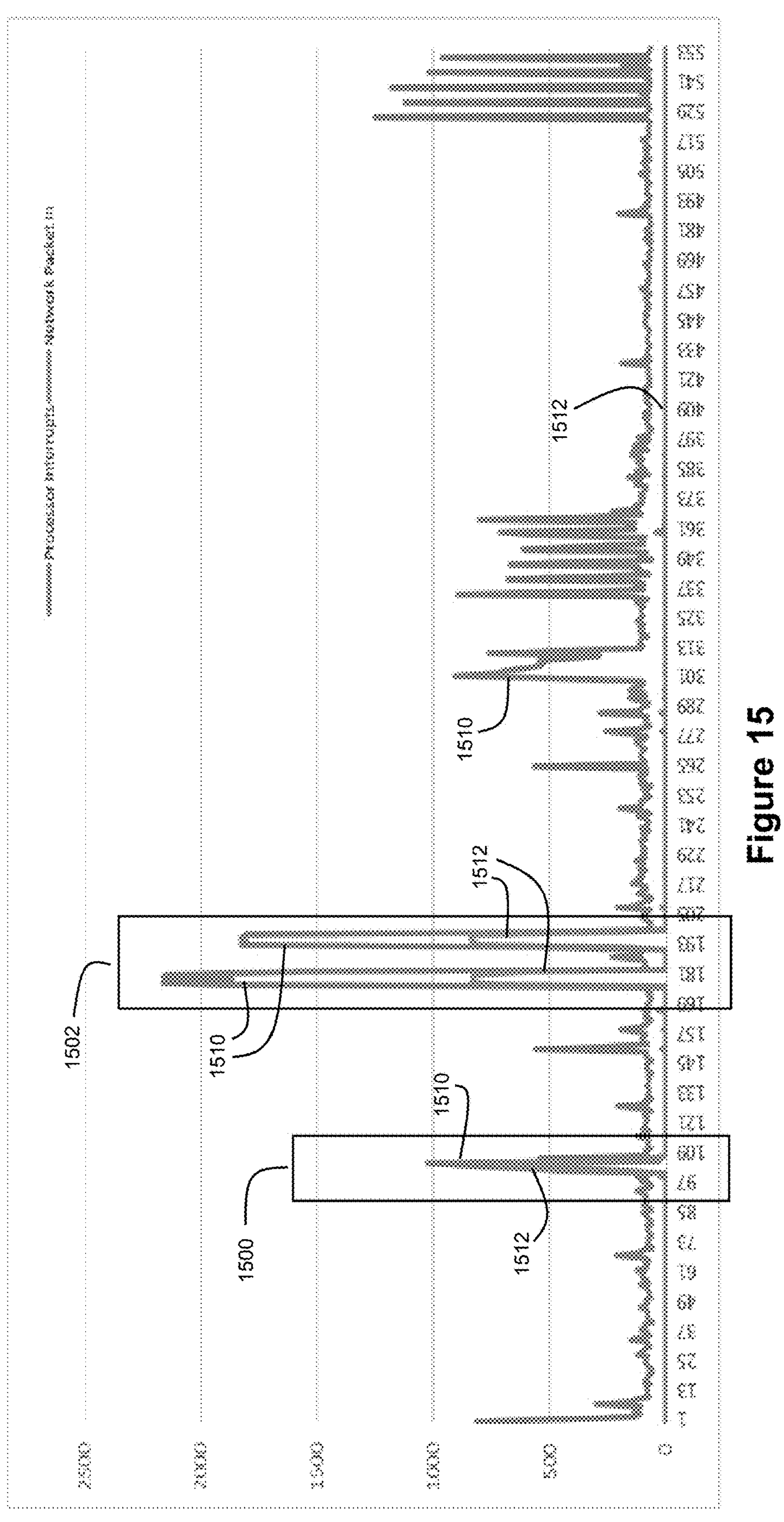

FIG. 15 shows a graph from a CollectI-only data set that was captured during a re-test of the attacked RHEL host system, and the plots are specific to activity on the NIC and CPUs (showing Network Packets Inbound via plot 1510 and Processor Interrupts per second to the CPUs via plot 1512). The X-axis is still time and equal to the 10-minute test period for the system, and Y-axis is activity. Box 1500 contains the first spike in NIC activity and correlates to a spike in processor activity directly matching the Nmap scan time. Box 1502 contains the next two spikes in NIC activity and correlates to spikes in processor activity relating to the Nessus scan time on the system. Thus, systems that demonstrated noticeable increases in these activities can be marked as test positive during analysis.

APPENDIX A: Example Collection, Testing, and Evaluation Procedures

Create full clone test system from research study baseline system configuration
  Select ORIGINAL RHEL BASELINE Virtual Machine and click Virtual Machine in the File Menu.
  Select Create Full Clone from the drop-down menu.
  Save As: TEST_SYSTEM ## and click Save.
  Once the Clone is complete, click the Play icon on the screen to start the target machine.
Boot *Kali* Linux attack system
Log into *Kali* Linux and start nessus
  Open a Terminal window:
    Start Nessus
    /etc/init.d/nessusd start
Once the RHEL target test system is running
  Log into target test system
Open terminal window on *Kali* Linux attack system
  Complete ifconfig command to identify attack system IP Address
Open terminal window on RHEL target test system
  Complete ifconfig command to identify target system IP Address
In terminal window on *Kali* Linux attack system
  Complete ping command to RHEL target IP Address to verify network connectivity to system
In terminal window on RHEL target test system
  Complete ping command to *Kali* Linux IP Address to verify network connectivity to system
On the RHEL target system
  Start Monitorix and open the webpage in Firefox
    In the terminal window enter:
      Service monitorix start→enter the administration password nimdanimda
    Open Firefox web browser and enter:
      URL: Localhost:8080/monitorix
      Hostname: localhost
    Select All graphs, Daily, OK
  Start Nmon
    Open terminal window
    Create directories for Nmon log
    Type: sudo mkdir/home/nmon/testsys #_nmon (if asked enter admin password: nimdanimda)
    Start Nmon
    Type: sudo nmon -s 1-c 600-f -t -m/home/nmon/testsys #_nmon (if asked enter admin password: nimdanimda)
    Start CollectI
    Type: collect -scdimnt >>/home/admin/testsys #_collectl
On the *Kali* Linux attack system:
  Open a Terminal window:
    Complete ping command to RHEL target IP Address ping XXX.XXX.XXX.XXX
    Complete Nmap scan of the RHEL target IP address nmap -A -sV -O -v XXX.XXX.XXX.XXX
  Execute Nessus scan of the RHEL target IP address
    Open Firefox and type URL:
      localhost:8834
      Login with user name and password and Select Scans
      Execute Basic Scan on the RHEL target system by entering the IP Address of Target System
  At the end of 10 minute log collection time on the RHEL target system
  On the RHEL target system
    Stop CollectI
      In the terminal window press Ctrl-C
    Copy Monitorix data from the Firefox web browser to text application
    Save Monitorix text file in Home\Documents folder
    Collect and copy the CollectI, Nmon, and Monitorix text files to removable media for storage.

Performance data can thus be collected via audit logs and system monitoring applications that include Monitorix, CollectI, and Nmon. Once collected, the performance data is imported into Microsoft Excel spreadsheets for analysis. This analysis involves comparing data collected from uncompromised baseline systems against data collected from systems attacked or compromised during cyberattack testing. All baseline and test data is imported into Microsoft Excel spreadsheets and plotted using IBM SPSS for graphical comparison and logistical regression analysis against the positive and negative predictive value theory. Graphical data and plots within IBM SPSS, Microsoft Excel, and the IBM Nmon Analysis application allow for the examination and visual comparison between uncompromised baseline system data and attacked and compromised system data captured during cyberattack testing. The visual and graphical comparison within IBM SPSS, Microsoft Excel, and the IBM Nmon Analysis application and logistical regression analysis allows a practitioner to visually examine the data for possible host-level system changes that can include performance surges, spikes, or anomalies in resource usage, timing, behavior, the operating environment that indicate a cyberattack.

Data specific to the variables (host system parameters) from each system is collected and compared against uncompromised baseline system performance data, test and retest system performance data, and the positive and negative predictive value theory benchmarks. Once collected, each system's variable data is separated into the following columns: variable, baseline benchmark, test, retest, positive predictive value, and negative predictive value.

Variable column data is divided by row under the following groups:
  Resource usage: central processing unit, power, random access memory, network card;
  Time: elapsed time for each process;
  Behavior: central processing unit, power, random access memory, network card, and user,
  Environment: Network Object Model Environment and command line interface Examining the raw data helps determine if one variable provides a better indication of an upcoming attack or a compromised system or if the variable has no value in predicting an upcoming cyber event.

Raw performance data is collected from each host-level system and includes each system's audit logs and performance data from the Monitorix, CollectI, and Nmon applications. The comma-separated-value data is imported into Microsoft Excel spreadsheets and in columns relevant to each variable, event, application, and log. Each row in the spreadsheet contains the collected data for each host-level baseline and operational system. If performance data cannot be imported automatically, a practitioner can manually enter by copying and pasting the recorded data into the correct cells in a Microsoft Excel spreadsheet. After the data is imported correctly and verified, the Microsoft Excel spreadsheets are imported into IBM SPSS software for graphing, visualization, analysis and review.

The graphical comparison, visualization, and logistical regression analysis allows a practitioner to visually inspect the performance data and recognize any changes (performance surges, spikes, or anomalies) occurring in system resource usage, timing, behavior, and environment in the host-level systems and peripherals. Additionally, time stamp correlation between Nmon, CollectI, host-level systems, and recorded test logs can be used to triangulate data and results and verify positive or false negative findings specific to a cyberattack. Time stamp triangulation can also be used to validate and verify performance data in Microsoft Excel and the IBM Nmon analysis software and to ensure all times corresponded to the host-level system logs and cyberattack times.

While the invention has been described above in relation to its example embodiments, various modifications may be made thereto that still fall within the invention's scope. For example, rather than developing attack signatures for a given type of cyberattack, the system could instead be configured to collect the normal system performance data using the techniques described herein from a host system known to be uncompromised by a cyberattack. The system could then collect the test system performance data, and this test system performance data can then be statistically compared with the normal system performance data to determine if any anomalies are present. In response to detection of anomalies in the test system performance data, these anomalies can be isolated and reported to a system administrator or other user for further review. While this approach is expected to have a higher false positive rate than the attack signature approach discussed above, the inventor believes the anomaly detection approach could still provide value to user. These and other modifications to the invention will be recognizable upon review of the teachings herein.

What is claimed is:

1. A system for generating a cyberattack signature based on host level data analysis, the system comprising:

a memory configured to store executable code; and a processor for cooperation with the memory;

wherein the processor, in response to execution of the executable code, is configured to:

collect normal system performance data from one or more host computer systems when the one or more host computer systems is known to not be under a cyberattack, wherein the normal system performance data comprises a plurality of data values that describe a set of internal system parameters of the one or more host computer systems when known to not be under the cyberattack during operation thereof over time;

collect attacked system performance data from one or more host computer systems when the one or more host computer systems is known to be under the cyberattack, wherein the attacked system performance data comprises a plurality of data values that describe the set of internal system parameters of the one or more host computer systems when known to be under the cyberattack during operation thereof over time;

apply host level data analytics to comparatively analyze the normal system performance data with respect to the attacked system performance data to identify a subset of the internal system parameters and their corresponding data values that discriminatively correlate to the cyberattack; and generate the cyberattack signature based on the subset of internal system parameters and their corresponding data values that are found to discriminatively correlate to the cyberattack.

2. The system of claim 1 wherein the comparative analysis comprises a regression analysis on different combinations of the internal system parameters.

3. The system of claim 1 wherein the processor, in response to execution of the executable code, is configured to run a performance monitoring application on the one or more host computer systems known to be under the cyberattack and known to not be under the cyberattack to collect the normal system performance data and the attacked system performance data.

4. The system of claim 3 wherein the performance monitoring application comprises Nmon, CollectI, and/or Monitorix.

5. The system of claim 1 wherein the subset of internal system parameters includes data that represents processor usage activity.

6. The system of claim 5 wherein the processor usage activity comprises processor switching activity.

7. The system of claim 5 wherein the processor usage activity comprises processor interrupt activity.

8. The system of claim 1 wherein the subset of internal system parameters includes network card activity.

9. The system of claim 1 wherein the subset of internal system parameters includes memory usage activity.

10. The system of claim 9 wherein the memory usage activity comprises RAM activity.

11. The system of claim 1 wherein the subset of internal system parameters includes power consumption.

12. The system of claim 1 wherein the subset of internal system parameters includes elapsed times for processes.

13. The system of claim 1 wherein the processor, in response to execution of the executable code, is configured to apply the host level data analytics by:

cloning the host computer system known to not be under the cyberattack;

running the cyberattack on the cloned host computer system; and collecting the attacked system performance data from the cloned host computer system on which the cyberattack is run.

14. The system of claim 1 wherein the one or more host computer systems known to be under the cyberattack and known to not be under the cyberattack are one or more Red Hat Enterprise Linux systems.

15. The system of claim 1 wherein the cyberattack comprises an Nmap enumeration scan.

16. The system of claim 15 wherein the cyberattack signature for the Nmap enumeration scan comprises an increase of at least two members of the group consisting of (1) activity for inbound network packets, (2) process switching per second, (3) processor usage, and (4) processor interrupts over a defined time period relative to a normal baseline for same.

17. The system of claim 15 wherein the cyberattack signature for the Nmap enumeration scan comprises an increase of (1) activity for inbound network packets, (2) process switching per second, (3) processor usage, and (4) processor interrupts over the defined time period relative to a normal baseline for same.

18. The system of claim 1 wherein the cyberattack comprises a Nessus enumeration scan.

19. A system for generating a cyberattack signature based on host level data analysis, the system comprising:

a memory configured to store executable code; and a processor for cooperation with the memory;

wherein the processor, in response to execution of the executable code, is configured to:

apply host level data analytics to system performance data with respect to a set of internal system parameters of one or more host computer systems that describe operation of the one or more host computer systems when known to be under a cyberattack and when known not to be under the cyberattack to find a subset of the internal system parameters and their corresponding data values that discriminatively correlate to the cyberattack, wherein the cyberattack comprises a Nessus enumeration scan; and generate the cyberattack signature based on the subset of internal system parameters and their corresponding data values that are found to discriminatively correlate to the cyberattack;

wherein the cyberattack signature for the Nessus enumeration scan comprises (1) an increase of at least two members of the group consisting of (i) activity for inbound network packets, (ii) process switching per second, (iii) processor usage, and (iv) processor interrupts over a first defined time period relative to a normal baseline for same, followed by (2) normal activity for the at least two members over a second defined time period, followed by (3) another increase of the at least two members over a third defined time period relative to the normal baseline for same.

20. The system of claim 19 wherein the cyberattack signature for the Nessus enumeration scan comprises (1) an increase of (i) activity for inbound network packets, (ii) process switching per second, (iii) processor usage, and (iv) processor interrupts over the first defined time period relative to the normal baseline for same, followed by (2) normal activity for same over the second defined time period, followed by (3) another increase of same over the third defined time period relative to the normal baseline for same.

21. The system of claim 1 wherein the processor comprises a plurality of processors.

22. A method for generating a cyberattack signature based on host level data analysis, the method comprising:

collecting normal system performance data from one or more host computer systems when the one or more host computer systems is known to not be under a cyberattack, wherein the normal system performance data comprises a plurality of data values that describe a set of internal system parameters of the one or more host computer systems when known to not be under the cyberattack during operation thereof over time;

collecting attacked system performance data from one or more host computer systems when the one or more host computer systems is known to be under the cyberattack, wherein the attacked system performance data comprises a plurality of data values that describe the set of internal system parameters of the one or more host computer systems when known to be under the cyberattack during operation thereof over time;

a processor applying host level data analytics by comparatively analyzing the normal system performance data with respect to the attacked system performance data to identify a subset of the internal system parameters and their corresponding data values that discriminatively correlate to the cyberattack; and the processor generating the cyberattack signature based on the subset of internal system parameters and their corresponding data values that are found to discriminatively correlate to the cyberattack.

23. The method of claim 22 wherein the processor comprises a plurality of processors.

24. An article of manufacture for generating a cyberattack signature based on host level data analysis, the article of manufacture comprising:

machine-readable code that is resident on a non-transitory computer-readable storage medium, wherein the code is executable by a processor to cause the processor to:

collect normal system performance data from one or more host computer systems when the one or more host computer systems is known to not be under a cyberattack, wherein the normal system performance data comprises a plurality of data values that describe a set of internal system parameters of the one or more host computer systems when known to not be under the cyberattack during operation thereof over time;

collect attacked system performance data from one or more host computer systems when the one or more host computer systems is known to be under the cyberattack, wherein the attacked system performance data comprises a plurality of data values that describe the set of internal system parameters of the one or more host computer systems when known to be under the cyberattack during operation thereof over time;

apply host level data analytics to comparatively analyze the normal system performance data with respect to the attacked system performance data to identify a subset of the internal system parameters and their corresponding data values that discriminatively correlate to the cyberattack; and generate the cyberattack signature based on the subset of internal system parameters and their corresponding data values that are found to discriminatively correlate to the cyberattack.

25. The system of claim 1 wherein the cyberattack comprises an enumeration cyberattack, and wherein the cyberattack signature comprises data that describes an impact of the enumeration cyberattack on the one or more host computer systems in terms of the identified subset of internal system parameters.

26. The system of claim 25 wherein the identified subset of internal system parameters include processor switching activity, processor interrupt activity, and network card activity.

* * * * *